(12) United States Patent
Niu et al.

(10) Patent No.: US 9,053,495 B1
(45) Date of Patent: Jun. 9, 2015

(54) GEOGRAPHICAL TARGETING FOR CONTENT MANAGEMENT OF CAMPAIGNS

(75) Inventors: Shu Niu, Palo Alto, CA (US); Amin Charaniya, Santa Clara, CA (US); Jamie Samdal, Mountain View, CA (US); Krzysztof Duleba, Pfaffikon (CH); Jessica Mignone, Morgan Hill, CA (US); Audrey Yang, San Francisco, CA (US); Prabhu Balasubramanian, Mountain View, CA (US); James Dowdell, Menlo Park, CA (US); Doris Bruneder, San Francisco, CA (US); Aileen Tang, Mountain View, CA (US); Smita Hashim, Saratoga, CA (US); Ankur Gupta, Bangalore (IN); Graham Jenkin, San Francisco, CA (US); Luuk van Dijk, Zurich (CH)

(73) Assignee: Google Inc., Mountain View, CA (US)

(*) Notice: Subject to any disclaimer, the term of this patent is extended or adjusted under 35 U.S.C. 154(b) by 99 days.

(21) Appl. No.: 13/587,838

(22) Filed: Aug. 16, 2012

Related U.S. Application Data

(60) Provisional application No. 61/524,277, filed on Aug. 16, 2011.

(51) Int. Cl.
*G06Q 30/00* (2012.01)
*G06Q 30/02* (2012.01)

(52) U.S. Cl.
CPC ........ *G06Q 30/0261* (2013.01); *G06Q 30/0255* (2013.01); *G06Q 30/0251* (2013.01); *G06Q 30/0256* (2013.01)

(58) Field of Classification Search
CPC .................................................. G06Q 30/0261
USPC ....................................................... 705/14.58
See application file for complete search history.

(56) References Cited

U.S. PATENT DOCUMENTS

| | | | |
|---|---|---|---|
| 5,930,474 A | 7/1999 | Dunworth et al. | |
| 6,119,133 A * | 9/2000 | Nusbickel et al. | ...................... 1/1 |
| 6,317,718 B1 * | 11/2001 | Fano | ........................... 705/14.39 |
| 7,123,918 B1 * | 10/2006 | Goodman | ...................... 455/446 |
| 2007/0173266 A1 | 7/2007 | Barnes | |
| 2009/0044246 A1 | 2/2009 | Sheehan et al. | |
| 2009/0271105 A1 | 10/2009 | Kindo et al. | |
| 2009/0284530 A1 * | 11/2009 | Lester et al. | ................... 345/440 |
| 2010/0082360 A1 * | 4/2010 | Chien et al. | ........................ 705/1 |

* cited by examiner

*Primary Examiner* — John G Weiss
*Assistant Examiner* — Scott C Anderson
(74) *Attorney, Agent, or Firm* — Dority & Manning, P.A.

(57) ABSTRACT

Configurations for geographical targeting for managing content of campaigns are disclosed. In one example, the subject technology provides a user interface including controls for enabling selection of targeting criteria by a content sponsor. The user interface includes a campaign tool for receiving input on campaign details to be executed by a content delivery system. The campaign tool includes a search control for receiving search strings and responsive thereto providing search completions that represent one or more geographic areas and reach information for each geographic area. The campaign tool also includes a control for adding a geographic area to a campaign, excluding the geographic area from the campaign, or presenting a map of the geographic area.

20 Claims, 19 Drawing Sheets

GEOGRAPHICAL TARGETING FOR CONTENT MANAGEMENT OF CAMPAIGNS

CROSS-REFERENCE TO RELATED APPLICATIONS

The present application claims the benefit of priority under 35 U.S.C. §119 from U.S. Provisional Patent Application Ser. No. 61/524,277 entitled "GEOGRAPHICAL TARGETING," filed on Aug. 16, 2011, the disclosure of which is hereby incorporated by reference in its entirety for all purposes.

BACKGROUND

This specification relates to content management.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, an auction can be performed, and the slots can be allocated to sponsors according, among other things, to their bids and/or the relevance of the sponsored content to content presented on a page hosting the slot or a request that is received for the sponsored content.

SUMMARY

Some configurations of the subject technology may be implemented in methods that include a method for example process for presenting a campaign management user interface to a content sponsor. The method comprises: providing, using one or more computing devices, a user interface including controls for enabling selection of targeting criteria by a content sponsor including: a campaign tool for receiving input on campaign details to be executed by a content delivery system, the campaign tool including: a search control for receiving search strings and responsive thereto providing search completions that represent one or more geographic areas and reach information for each geographic area; and a control for adding a geographic area to a campaign, excluding the geographic area from the campaign, or presenting a map of the geographic area.

Some configurations of the subject technology may be implemented in methods that include a method for presenting a campaign management user interface to a campaign sponsor. The method comprises: presenting for display a user interface to a campaign sponsor, using one or more computing devices, the user interface including a control for enabling the user to search for geographic areas for targeting content in a campaign where presenting includes presenting a search control for customizing targeting for the campaign; receiving, in the search control, using the one or more computing devices, a textual description for a targeting area to be associated with the campaign; providing for display, using the one or more computing devices, one or more completions based on the received textual description, each completion satisfying the textual description, where providing the one or more completions includes providing one or more geographic areas that are associated with or described by the textual description and further including providing reach information describing an estimated reach in terms of the number of users that are associated with the geographic area in a predetermined time period; receiving, using the one or more computing devices, a selection of one or more of the completions, and adding, using the one or more computing devices, an associated geographic area to the campaign or excluding the associated geographic area from the campaign based on the selection.

Some configurations of the subject technology may be implemented in methods that include a method for presenting a campaign management user interface to a campaign sponsor. The method comprises: presenting a user interface to a campaign sponsor, using one or more computing devices, for customizing targeting information for a campaign including a search control for discovering areas for targeting; receiving, using the one or more computing devices, user input in the search control including a textual description of an area to target; providing one or more completions that satisfy the textual description, including providing reach information for each completion, each completion representative of a geographic feature that can be targeted in the campaign; receiving, using the one or more computing devices, user input to select at least one of the completions corresponding to a geographic area; and adding, using the one or more computing devices, the geographic area to the campaign or excluding the geographic area from the campaign based on the selection.

Some configurations of the subject technology may be implemented in a non-transitory computer-readable medium comprising instructions stored therein, which when executed by a machine, cause the machine to perform operations. The operations include presenting for display, using one or more computing devices, a user interface to a campaign sponsor for customizing targeting information for a campaign including a search control for discovering areas for targeting; receiving, using the one or more computing devices, user input in the search control including a textual description of an area to target; providing for display, using the one or more computing devices, one or more completions that satisfy the textual description, including providing reach information for each completion, each completion representative of a geographic feature that can be targeted in the campaign; receiving, using the one or more computing devices, user input to select at least one of the completions corresponding to a geographic area; and adding, using the one or more computing devices, the geographic area to the campaign or excluding the geographic area from the campaign based on the selection.

Some configurations of the subject technology may be implemented in a system. The system includes a content delivery system and a campaign management user interface. The campaign management user interface includes a campaign tool configured to receive input on campaign details to be executed by the content delivery system. The campaign tool is configured to present for display a user interface to a campaign sponsor the user interface including a control for enabling the user to search for geographic areas for targeting content in a campaign where presenting includes presenting a search control for customizing targeting for the campaign; receive, in the search control a textual description for a targeting area to be associated with the campaign; provide for display one or more completions based on the received textual description, each completion satisfying the textual description, where providing the one or more completions includes providing one or more geographic areas that are associated with or described by the textual description and further including providing reach information describing an estimated reach in terms of the number of users that are associated with the geographic area in a predetermined time period; receive a selection of one or more of the completions; and add an associated geographic area to the campaign or excluding the associated geographic area from the campaign based on the selection.

These and other implementations can each include one or more of the following features. A control for enabling display of a map for visually presenting on a map a geographic area associated with a given completion can be presented, along with the one or more completions. Providing one or more completions can include providing a control for presenting a map of a geographic area associated with a completion, and presenting the geographic area in a map upon receipt of a selection of the control by a user. A label associated with each completion can be provided that represents a specific geographic area and includes one or more hierarchical elements that are in a path description for a respective geographic area. Estimated reach information can be determined for each completion and presented with each completion. A confidence level associated with the estimated reach information can be determined and a limited reach indicator can be provided if the confidence level is below a predetermined threshold.

Some implementations may realize one or more of the following advantages. A campaign sponsor can search for geographic locations to add to or exclude from a content campaign. Estimated reach information can be displayed for matching geographic locations and matching geographic locations can be displayed on a map.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A user interface can be presented to a campaign sponsor for enabling the campaign sponsor to identify geographic areas for targeting content in a campaign. A textual description for a targeting area to be associated with the campaign can be received in a search control. One or more completions can be provided based on the received textual description, where each completion satisfies the textual description and where each completion includes a geographic area that is associated with or described by the textual description. A selection of one or more of the completions can be received, and an associated geographic area can be added to the campaign or excluded from the campaign based on the selection.

The user interface can also include, in response, for example, to the campaign sponsor selecting a particular geographic area, one or more geographic areas that are nearby the particular geographic area. Various approaches can be used to determine nearby geographic areas. The campaign sponsor can select one or more of the nearby geographic areas to indicate that the selected geographic area(s) are to be added to the campaign.

The content delivery system can also provide back-end functionality which supports the user interface, such as support for classifying geographic information. For example, the content delivery system can provide a flexible geographic hierarchy of labels which can be used to classify geographic locations. The content delivery system can, for example, classify a geographic location and place the geographic location in the flexible geographic hierarchy, which can include assigning respective labels at each hierarchical level in the flexible geographic hierarchy that includes the geographic location. The flexible hierarchy can enable, for example, the content delivery system to assign a different number of labels to a first geographic location than a number of labels previously assigned to a second geographic location.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of the user cannot be determined.

Example Systems

Figure 1:
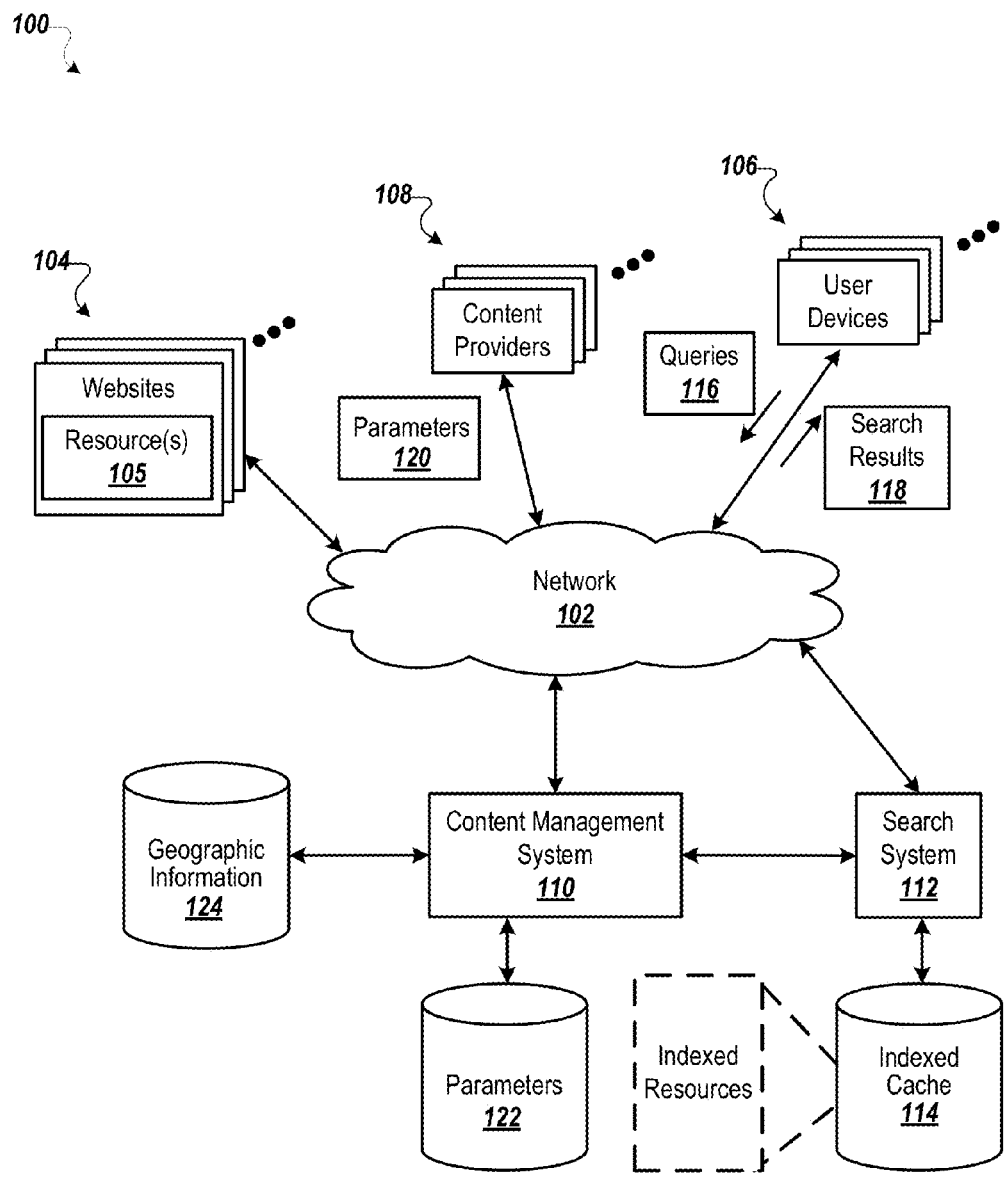
FIG. 1 is a block diagram of an example environment for content management.

FIG. 1 is a block diagram of an example environment 100 for content management. The example environment 100 includes a network 102, such as a local area network (LAN), a wide area network (WAN), the Internet, or a combination thereof. The network 102 connects web sites 104, user devices 106, content providers 108 (e.g., campaign sponsors, advertisers), publishers, and a content management system 110. The example environment 100 may include many thousands of web sites 104, user devices 106, and content providers 108. The content management system 110 may be used for selecting and providing content in response to requests for content.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104. A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, images and sounds, that may include embedded information (such as meta-information hyperlinks) and/or embedded instructions (such as JavaScript scripts).

To facilitate searching of resources 105, the environment 100 can include a search system 112 that identifies the resources 105 by crawling and indexing the resources 105 provided by the content publishers on the web sites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. User devices 106 can also submit search queries 116 to the search system 112 over the network 102. In response to a search query 116, the search system 112 can access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

When a resource 105 or search results 118 are requested by a user device 106, the content management system 110 may receive a request for content to be provided with the resource 105 or search results 118. The request for content can include characteristics of one or more "slots" that are defined for the requested resource 105 or search results page. For example, the data representing the resource 105 can include data specifying a portion of the resource 105 or a portion of a user display, such as a presentation location of a pop-up window or a slot of a third-party content site or web page, in which content can be presented. An example slot is an ad slot. Search results pages can also include one or more slots in which other content items (e.g., ads) can be presented.

Information about slots can be provided to the content management system 110. For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). The content management system 110 can select some or all of the eligible content items for presentation in slots of a resource 105 or search results page 118. Eligible content items may be selected based at least in part on results of an auction. Eligible content items can include content items that have characteristics matching the characteristics of a slot and that are identified as relevant to one or more resource keywords or search queries 116. For example, an eligible content item may be associated with one or more targeting keywords that match a resource keyword or a search query 116. A targeting keyword can match a resource keyword or a search query 116 by having the same textual content ("text") as the resource keyword or search query 116. For example, a content item associated with the targeting keyword "hotels" can be an eligible content item for a content request that is associated with the resource keyword "hotels" or the search query "hotels."

A content provider 108 can create a content campaign using tools provided by the content management system 110. For example, the content management system 110 can provide one or more account management user interfaces for creating and managing content campaigns. The account management user interface can be made available to the content provider 108, for example, either through an online interface provided by the content management system 110 or as an account management software application installed and executed locally at a content provider's client device.

The content provider 108 can, using the account management user interface, provide campaign parameters 120 which define a content campaign. The campaign parameters 120 can be stored in a parameters data store 122. Campaign parameters 120 can include, for example, a campaign name, a preferred content network for placing content, a budget for the campaign, start and end dates for the campaign, a schedule for content placements, a targeted language, and one or more targeted geographical locations. A campaign can be created and activated for the content provider 108 according to the parameters 120 specified by the content provider 108.

The account management user interface can include one or more controls for enabling selection of targeting criteria by the content provider 108. For example, the account management user interface can include a campaign tool for receiving input on campaign details to be executed by the content management system 110. The campaign tool can include, for example, a search control for receiving search strings. In response to receiving a search string, the content management system 110 can provide one or more search completions that represent one or more geographic areas and reach information for each geographic area. The campaign tool can also include one or more controls for adding a geographic area to a campaign, excluding a geographic area from the campaign, or presenting a map of a geographic area.

The account management user interface can also present, such as in response to the content provider 108 selecting a particular completion, one or more geographic areas that are nearby the geographic area associated with the completion. A nearby geographic location can be, for example, adjacent, proximate or including (e.g., enclosing) the geographic area associated with the completion. The content provider 108 can select one or more of the nearby geographic areas to indicate that the selected geographic area(s) are to be added to the campaign or excluded from the campaign.

The content management system 110 can provide support for classifying geographic information. For example, the content management system 110 can provide a flexible geographic hierarchy of labels, which can be represented by geographic information stored in a data store 124. The flexible geographic hierarchy can be used to classify geographic locations. The content management system 110 can, for example, classify a geographic location in accordance with the flexible geographic hierarchy, which can include assigning respective labels from each hierarchical level in the flexible geographic hierarchy that includes the geographic location, including assigning one or more labels to the geographic location.

The flexible hierarchy can enable, for example, the content management system 110 to assign a different number of labels to a first geographic location than a number of labels previously assigned to a second geographic location. For example, the city of Chicago can be associated with city, state, and country labels of "Chicago", "Illinois", and "United States", respectively, and a country such as Barbados can be represented by a single, country label of "Barbados". The flexible geographic hierarchy is described in more detail below with respect to FIGS. 17 and 18. FIGS. 2 to 13 illustrate example account management user interfaces provided by the content management system 110.

Example User Interfaces

Figure 2:
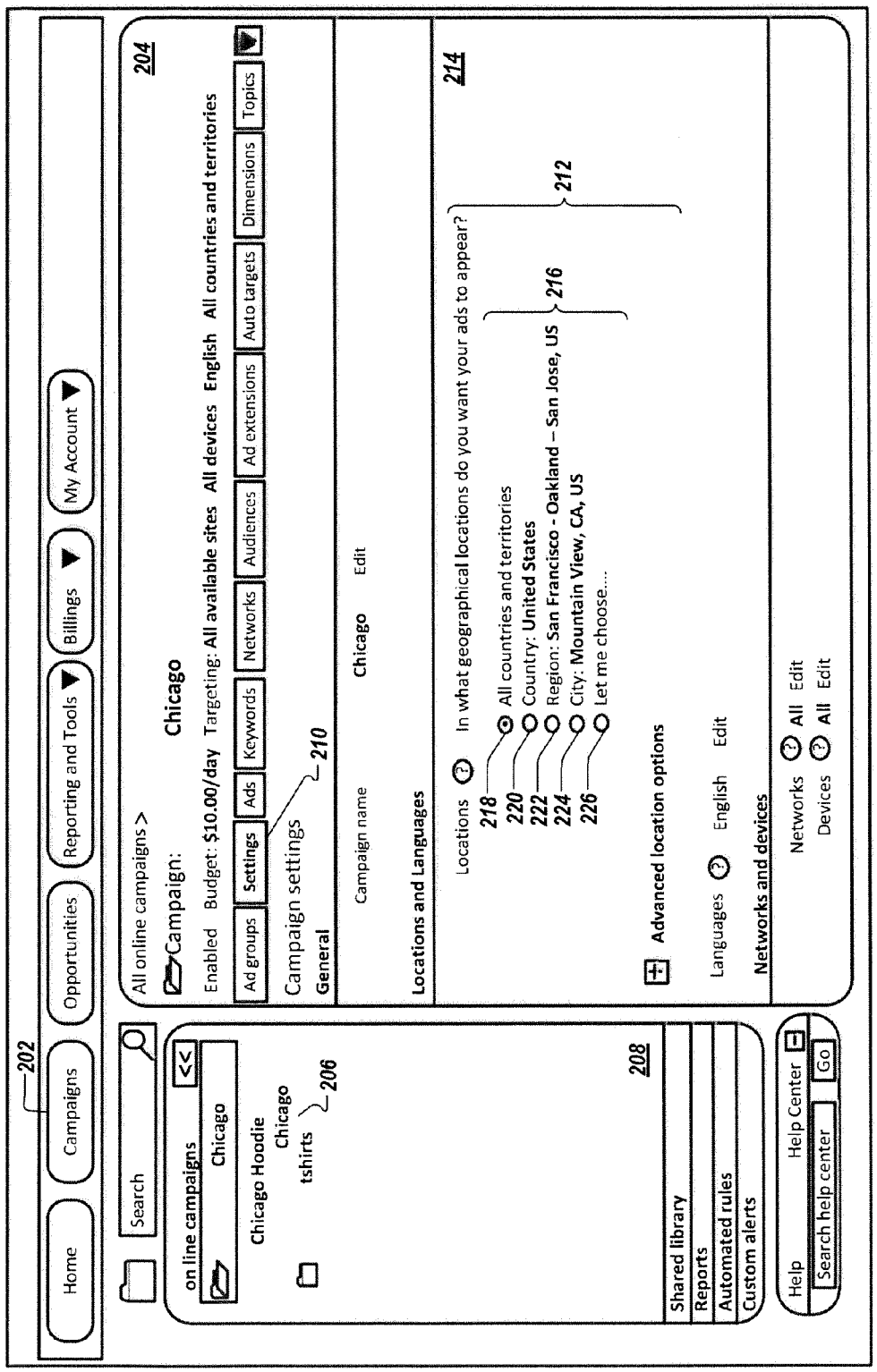
FIG. 2 illustrates an example user interface for developing a content campaign.

FIG. 2 illustrates an example user interface 200 for developing a content campaign. A user, such as a campaign sponsor, can select a tab 202 to display a campaign area 204. The user can edit an existing campaign in the campaign area 204 by selecting the name of an existing campaign (e.g., a name 206) in a campaign list 208. The campaign area 204 or a similar interface can be used to create a new campaign.

The campaign sponsor can select a control 210 to display campaign settings in the campaign area 204. The campaign settings can include, among other settings, location settings 212 included in a locations and languages settings area 214. The location settings 212 include controls 216, which allow the campaign sponsor to specify in which geographic location(s) the campaign sponsor desires a user to be present in (and/or, in some implementations, express an interest in) for content items to be presented to the user. For example, the campaign sponsor can select a control 218 to specify that the campaign sponsor desires content items to be presented in all countries and territories. As another example, the campaign sponsor can select a control 220, 222, or 224 to specify that the campaign sponsor desires content items to be presented in a particular geographic location (e.g., the United States, the San Francisco metro area, or the city of Mountain View, Calif., respectively).

The locations that are displayed in the controls 220, 222, and 224 can be based, for example, on location information included in a campaign sponsor's profile or can be based on locations otherwise associated with the campaign sponsor (such as locations the campaign sponsor has previously targeted). Although three controls 220, 222, and 224 corresponding to geographical hierarchy levels of country, region, and city, are displayed, more or fewer controls that are associated with more or fewer geographical hierarchy levels can be displayed. For example, if the campaign sponsor historically has only targeted entire countries or entire states, then a state-related or a country-related control can be displayed instead of the controls 220, 222, and 224.

As another example, a location associated with the campaign sponsor may be associated with different and/or a different number of geographical hierarchy levels than the country, region, and city levels associated with the controls 220, 222, and 224. For example, the campaign sponsor may have historically targeted Philippines users and may have previously identified locations in the Philippines to target by selecting particular villages (e.g., barangays), cities, provinces, and regions with the Philippines. In such an example, in place of the controls 220, 222, and 224, five controls can be displayed which represent a most frequently targeted village, city, province, and region within the Philippines, and the country of the Philippines, respectively.

If one of the choices represented by the control 218 or the controls 220, 222, and 224 are applicable to the campaign sponsor, the campaign sponsor can select a corresponding control. However, the campaign sponsor may desire to further customize locations to be targeted by the campaign. In such a situation, the user can select a control 226 to choose one or more other geographic locations.

Figure 3:
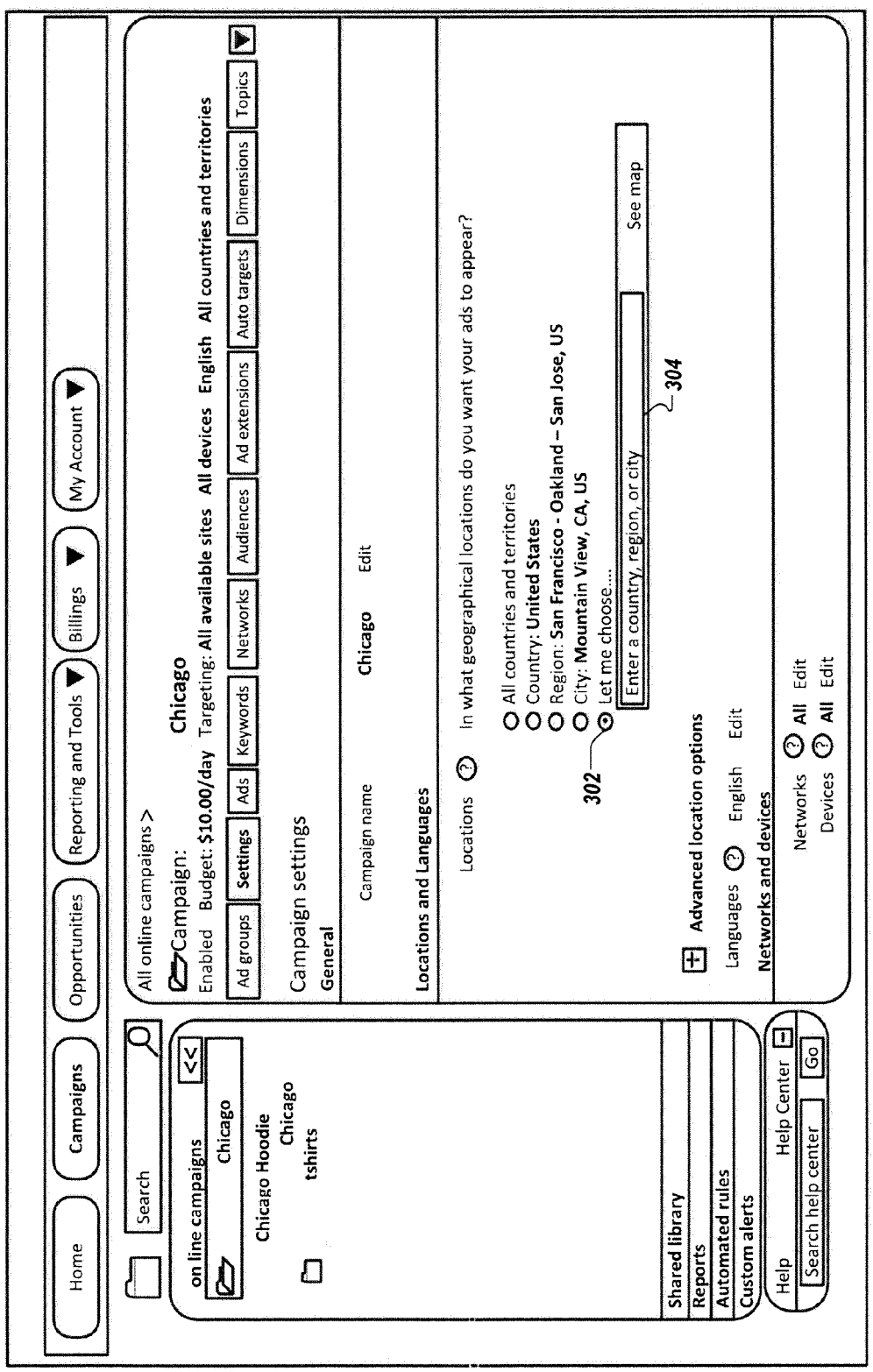
FIG. 3 illustrates an example user interface which allows the user to select one or more geographic locations.

For example, FIG. 3 illustrates an example user interface 300 which allows the user to provide one or more geographic locations. In response to selection of a control 302 (e.g., where the control 302 corresponds to the control 226 described above with respect to FIG. 2), a search control 304 can be displayed. The user can use the control 304 to provide a country name, city name, region name, or the name of some other geographic location. In response to user input in the control 304, one or more search completions can be displayed, where each search completion represents a geographic location which matches the user input.

Figure 4:
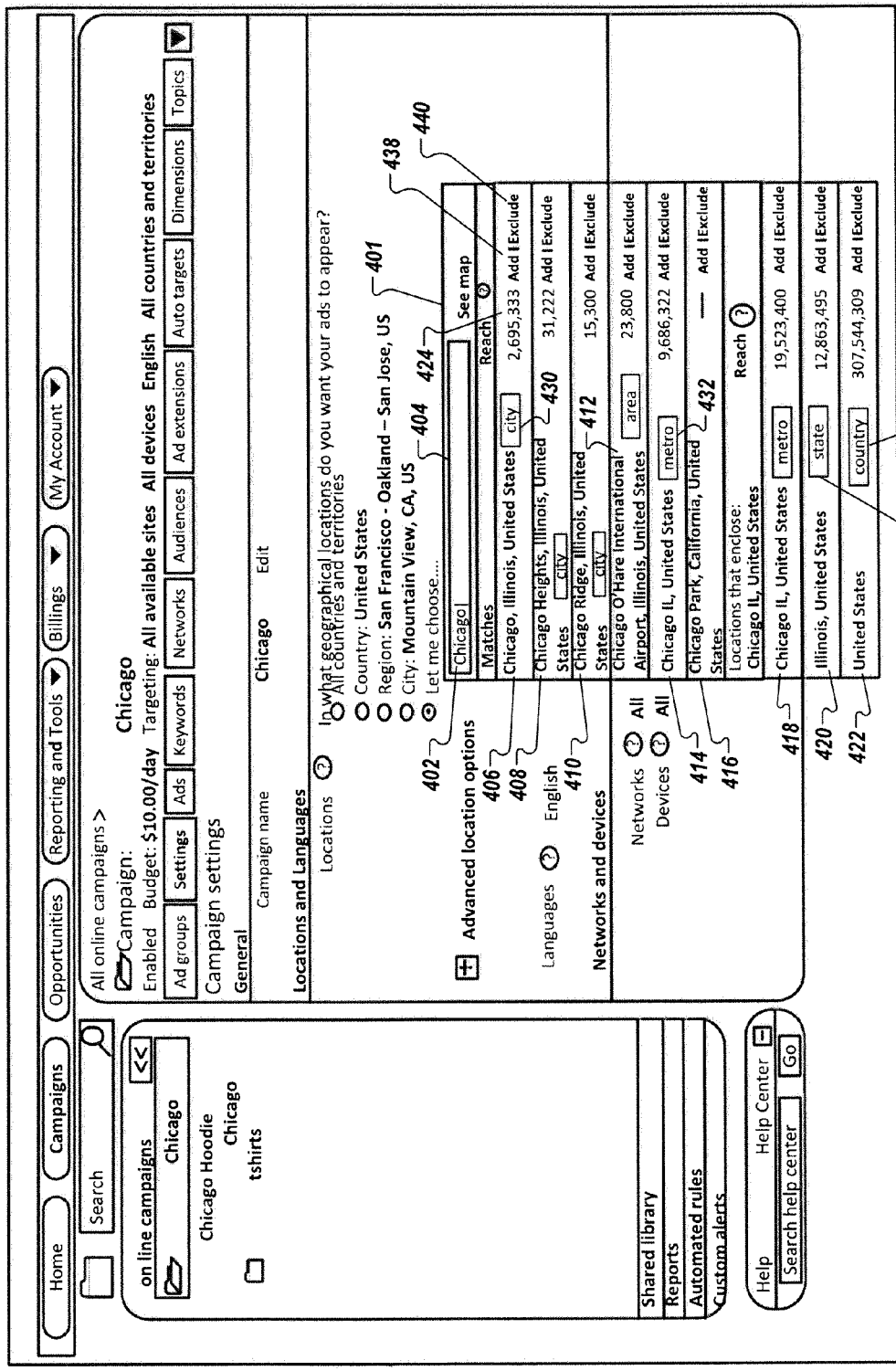
FIG. 4 illustrates an example user interface which includes a search completions area.

For example, FIG. 4 illustrates an example user interface 400 which includes a search completions area 401. In response to the user entering text "Chicago" 402 into a search control 404, the search completions area 401 is displayed. The search completions area 401 includes search completions 406-416 (e.g., corresponding to the cities of Chicago, Chicago Heights, and Chicago Ridge, Chicago O'Hare International Airport, the Chicago metro area, and the unincorporated Chicago Park, Calif., respectively, with the city of Chicago completion 406 being a top match. The search completions area 401 also includes completions 418, 420, and 422, corresponding to geographic areas of the Chicago metro area, the state of Illinois, and the United States, each being geographic areas which include the top match of the city of Chicago.

If the user changes the text 402 (e.g., by deleting or adding characters), the search completions area 401 can update automatically in response to each change of the text 402 to show completions corresponding to the current value of the text 402. In some implementations, if no locations match the text 402, an error message can be displayed. In some implementations, determining completions for the text 402 can include identifying completions that match a spelling-error correction of the text 402. For example, if the user enters the text "Chicago" into the search control 404, the search completions area 401 can display completions for "Chicago", as shown.

Each of the completions 406-422 can include corresponding estimated reach information. In some implementations, the estimated reach information indicates a number of unique users who may be exposed to a particular content item. For example, the completion 406 includes reach information 424 which indicates that the city of Chicago includes 2,695,333 unique users who may be exposed to a particular content item. Each of the completions 406-422 can be selectable, and upon selection of a completion, a corresponding geographic location can be displayed in a map user interface.

Each completion can include one or more labels, where each label is associated with a respective level in a geographic hierarchy that includes the location associated with the completion. For example, the completion 406 includes city, state, and country labels of "Chicago", "Illinois", and "United States", respectively. As another example, the completion 420 includes state and country labels of "Illinois" and "United States", respectively. Each completion can include an indicator which indicates the type of location associated with the completion. For example, the completion 406 includes a city indicator 430, the completion 414 includes a metro indicator 432, the completion 420 includes a state indicator 434, and the completion 422 includes a country indicator 436. Other indicators are possible, including one or more badges such as limited reach badges discussed in greater detail below.

The user can add a geographic location corresponding to a particular completion 406-422 to the campaign. For example, the user can add the geographic location of the city of Chicago corresponding to the completion 406 to the campaign by selecting an add control 438. Similarly, the user can exclude the geographic location corresponding to the completion 406 from the campaign by selecting an exclude control 440. In some implementations, the user can add the top completion 406 to the campaign by pressing an "enter" key. A list of added (e.g., selected) and excluded geographic locations can be displayed to the user.

A warning or indicator can be displayed to the user, for example, if the user adds or attempts to add the same location twice or if the user adds and excludes the same location. As another example, an indicator or warning can be displayed if the user either adds or excludes both an enclosing location (e.g., the state of Illinois) and an enclosed location (e.g., the city of Chicago). The indicator can be a "badge" that is displayed next to the location name, such as in a selected locations list or in an excluded locations list.

Figure 5:
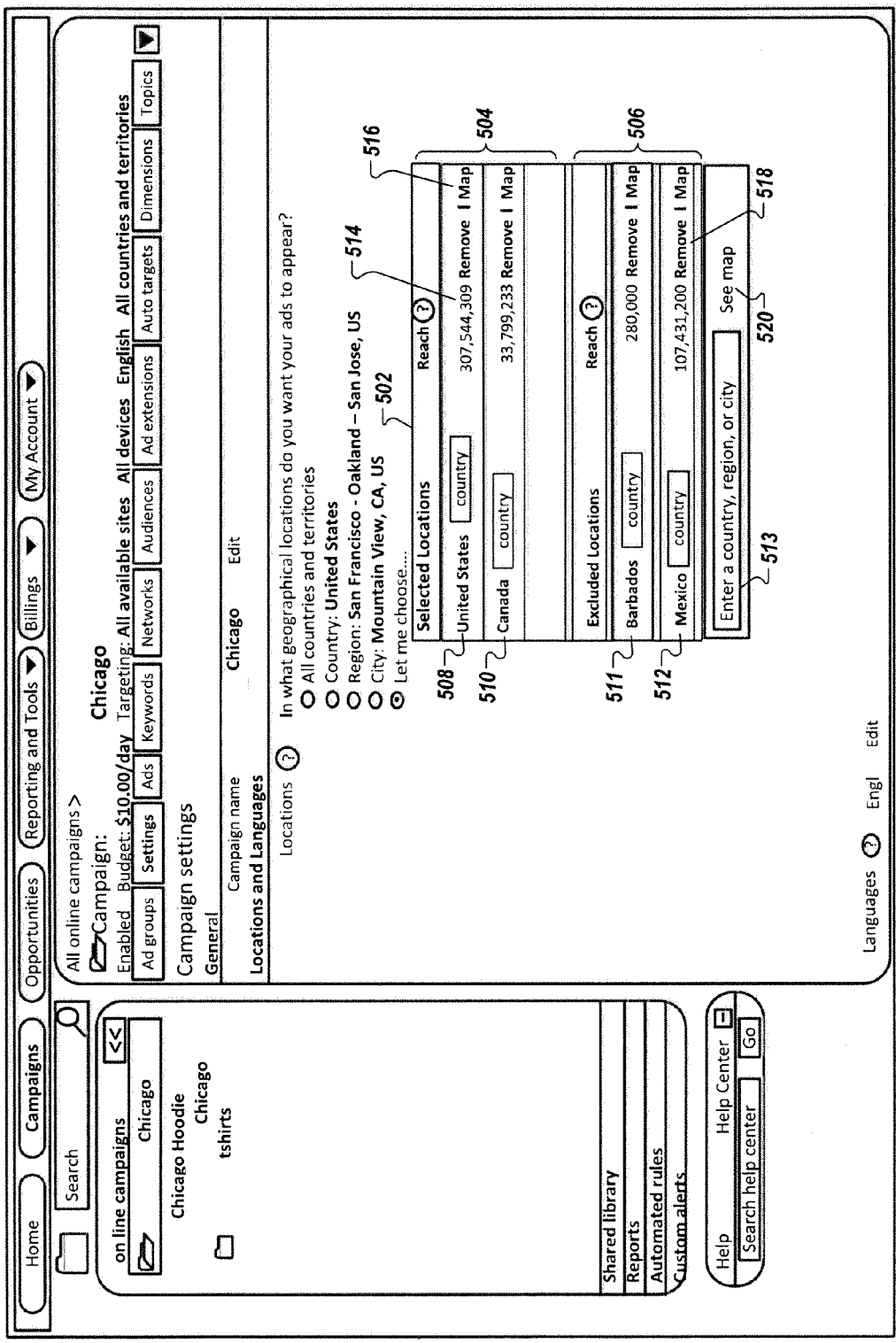
FIG. 5 illustrates an example user interface that includes a selected-excluded locations list.

For example, FIG. 5 illustrates an example user interface 500 that includes a selected-excluded locations list 502. The selected-excluded locations list 502 can be displayed, for example, in response to the user adding a geographic location to or excluding a geographic location from the campaign. The selected-excluded locations list 502 includes, in a selected locations area 504, geographic locations which have been added to the campaign, and includes, in an excluded locations area 506, geographic locations which have been excluded from the campaign. For example, the selected locations area 504 includes entries 508 and 510 corresponding to selected geographic locations of the United States and Canada, respectively. As another example, the excluded locations area 506 includes entries 511 and 512 corresponding to excluded geographic locations of Barbados and Mexico, respectively.

The user can provide user input in a search control 513 to specify an additional geographic location. In response to user input in the search control 513, the user interface 500 can change to include a search completions area (e.g., an interface similar to the search completions area 401 described above with respect to FIG. 4). The user can, using the search completions area, add or exclude a geographic location corresponding to the content of the search control 513.

Each entry in the selected locations area 504 and the excluded locations area 506 can include corresponding estimated reach information. For example, the entry 508, corresponding to the United States, includes reach information 514. A user can select a map control (e.g., a map control 516) to display a map for a corresponding entry. The user can select a remove control to remove a corresponding entry from the selected locations area 504 or the excluded locations area 506. For example, the user can select a remove control 518 to remove the geographic location of Mexico from the excluded locations area 506, resulting in Mexico no longer being excluded from the campaign. The user can select a map control 520 to see the selected and excluded locations on a map.

Figure 6:
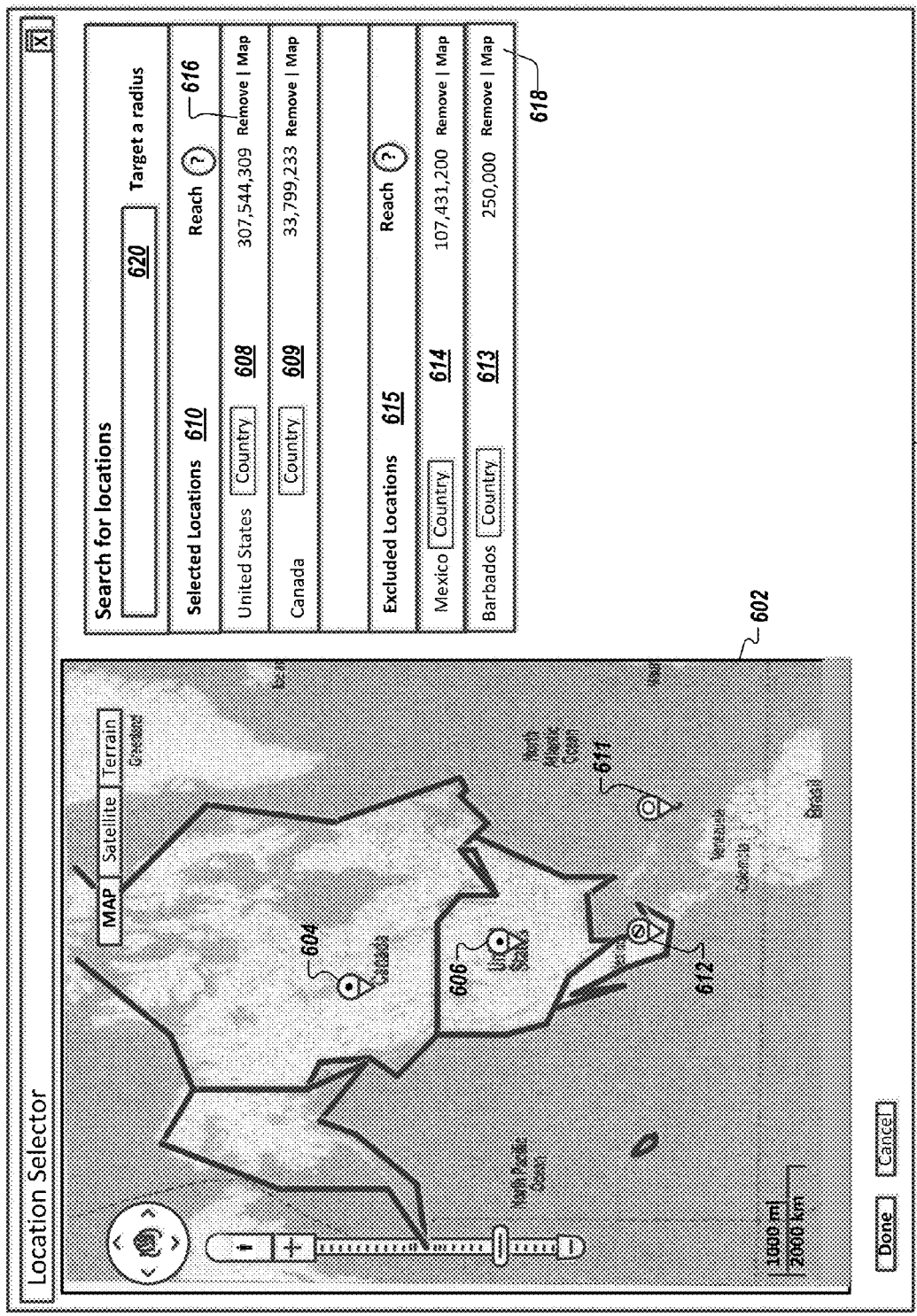
FIG. 6 illustrates an example user interface for displaying selected and excluded locations on a map.

For example, FIG. 6 illustrates an example user interface 600 for displaying selected and excluded locations on a map 602. The map 602 includes markers 604 and 606, which correspond to the selected locations of United States and Canada and to entries 608 and 609 in a selected locations list 610, respectively. The map 602 also includes markers 611 and 612, which correspond to the excluded locations of Barbados and Mexico and to entries 613 and 614 in an excluded locations list 615, respectively.

The user can select a remove control, such as remove control 616, to remove a location from the selected locations list 610 or the excluded locations list 615. The user can select a map control, such as map control 618, to display a map of a location included in the selected locations list 610 or the excluded locations list 615. The user can provide user input in a search control 620 to specify an additional geographic location. In response to user input in the search control 620, the user interface 600 can change to include a search completions area.

Figure 7:
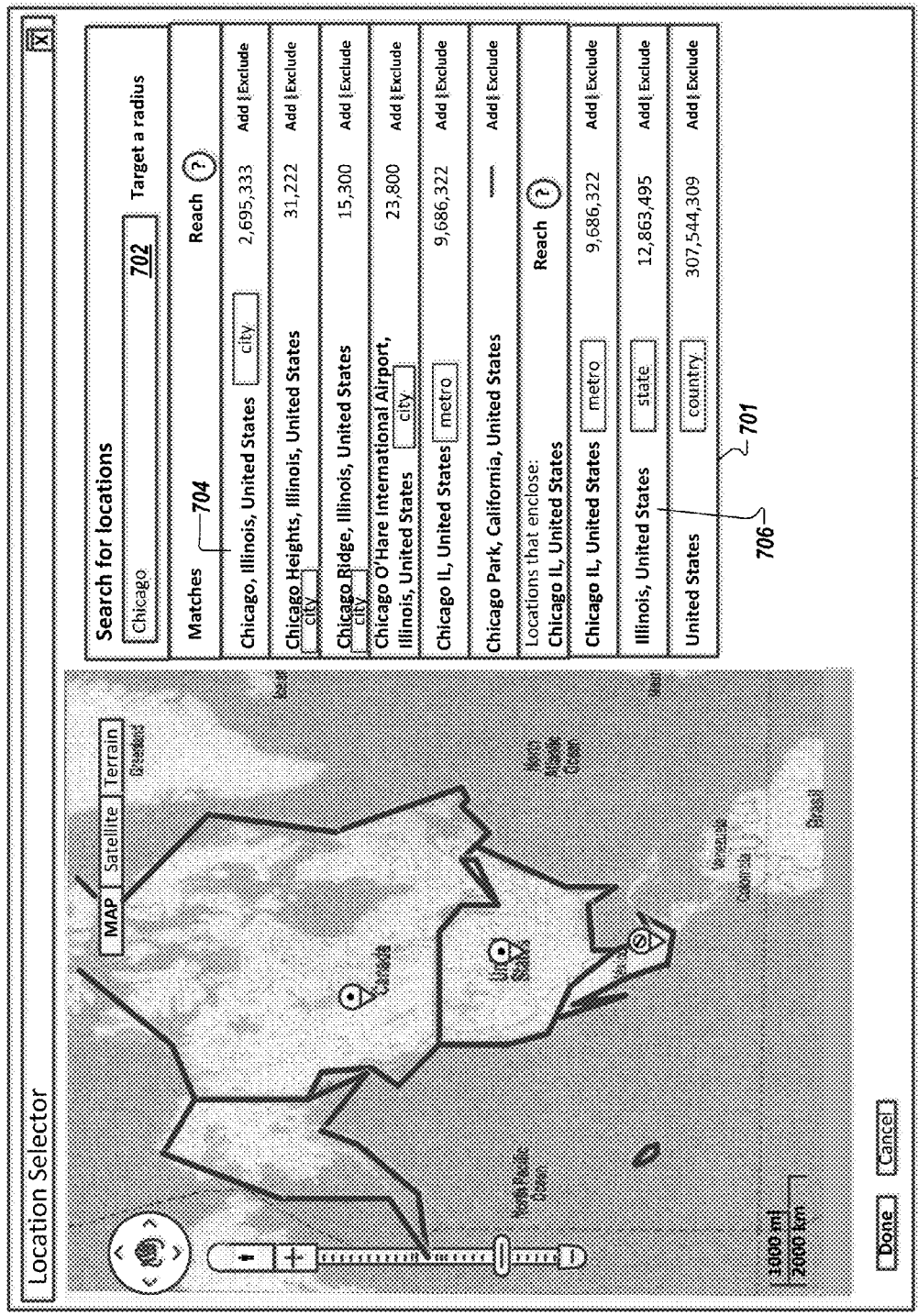
FIG. 7 illustrates an example user interface which includes a search completions area.

For example, FIG. 7 illustrates an example user interface 700 which includes a search completions area 701. The search completions area 701 can be displayed, for example, in response to the user entering the text "Chicago" into a search control 702. The search completions area 701 can be an interface similar to the search completions area 401 described above with respect to FIG. 4. For example, the search completions area 701 includes completions which match the text "Chicago" (e.g., a completion 704, which is a top match) and completions, such as a completion 706, which enclose the completion 704. A user can select a completion to view the corresponding geographic location on a map and to view additional details about the geographic location.

Figure 8:
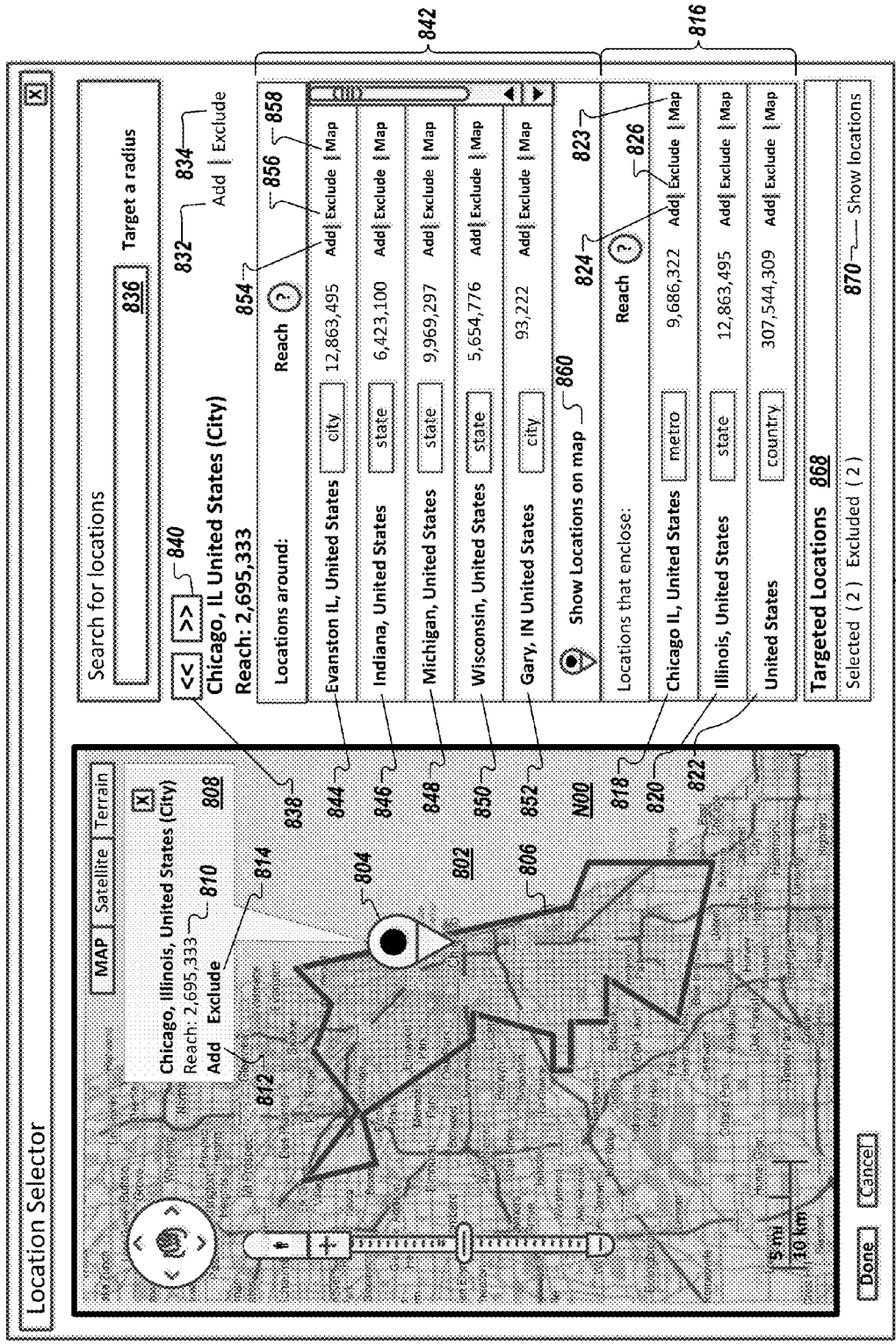
FIG. 8 illustrates an example user interface displayed in response to selection of a completion.

For example, FIG. 8 illustrates an example user interface 800 displayed in response to selection of a completion (e.g., the user interface 800 can be shown in response to selection of the completion 704 which represents the city of Chicago). The user interface 800 includes a map 802. The map 802 displays the geographic location of interest (e.g., the city of Chicago), including a marker 804 which marks the geographic location of interest and a border 806 which forms an outline of the geographic location of interest on the map 802. The border 806 can mark, for example, a political border (e.g., an official border as defined by an entity such as a city, county, state, or country) or can mark an approximate area, such as an area that is approximated based on mapping one or more IP addresses to a particular geographic area. The user can select the marker 804 to display a pop-up 808. In some implementations, the pop-up 808 displays estimated reach information 810 for the geographic location of interest and includes a control 812 which can be used to add the geographic location of interest to the campaign and a control 814 which can be used to exclude the geographic location of interest from the campaign.

Similar to the search completions areas 401 and 701 described above with respect to FIGS. 4 and 7, the user interface 800 includes an enclosing locations list 816 which includes geographic locations of the Chicago metro area 818, the state of Illinois 820, and the United States 822, each of which enclose the city of Chicago. The map 802 can be updated to display an enclosing geographic location 818, 820, or 822 by selecting a map control in the enclosing locations list, such as a map control 823. An enclosing geographic location 818, 820, or 822 can be added to the campaign by selecting a control such as an add control 824 and can be excluded from the campaign by selecting a control such as an exclude control 826.

The user can use a control 832 to add the geographic location of interest (e.g., the city of Chicago) to the campaign and a control 834 to exclude the geographic location of interest from the campaign. The user can use a search control 836 to search for a different location of interest. If the user views more than one location of interest using the user interface 800, the user can use a back control 838 and a forward control 840 to navigate to previously-displayed locations of interest.

The user interface 800 includes a nearby locations list 842 which includes locations that are nearby the location of interest. For example, the nearby locations list 842 includes locations near the city of Chicago, such as the city of Evanston, Ill. 844, the state of Indiana 846, the state of Michigan 848, the state of Wisconsin 850, and the city of Gary, Ind. 852.

A particular nearby location 844-852 can be added to the campaign by selecting an add control, such as an add control 854. A particular nearby location 844-852 can be excluded from the campaign by selecting an exclude control, such as an exclude control 856. A particular nearby location 844-852 can be displayed in the map 802 by selecting a map control, such as a map control 858. All of the nearby locations 844-852 can be simultaneously displayed in the map 802 by selecting a control 860. In some implementations, nearby locations can be defined as locations that are either adjacent, proximate, overlapping, or including (e.g., enclosing) an existing geographic selection. Determining nearby locations is described in more detail below with respect to FIG. 16.

A targeted locations area 868 indicates that there are currently two locations selected for the campaign and two locations excluded from the campaign. In some implementations, the selected and excluded locations can be displayed on the map 802 along with the location of interest. For example, the map 802 can be zoomed/expanded so that the selected locations, the excluded locations, and the location of interest are each visible on the map 802. In some implementations, selected locations, excluded locations, and the location of interest can each appear differently in the map 802, such as in a different color and/or with a different-looking marker.

The user can select a show locations control 870 to view the selected and excluded locations. For example, in response to selection of the control 870, the map 802 can be updated to display the selected and excluded locations. As another example, the user interface 800 can be updated to include a list of selected and excluded locations (e.g., the user interface 800 can update to be similar to the user interface 600 described above with respect to FIG. 6).

Figure 9:
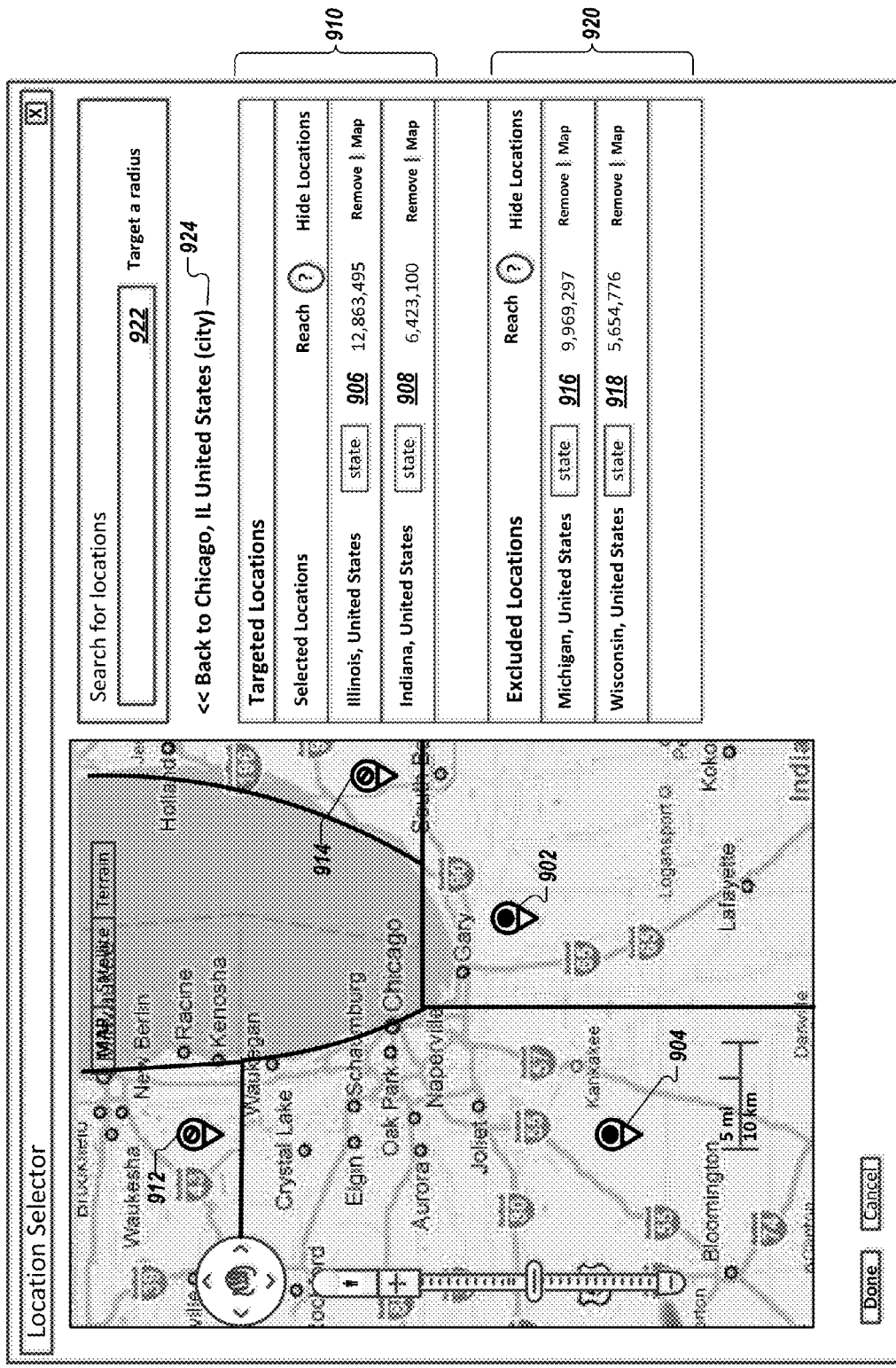
FIG. 9 illustrates an example user interface that displays selected and excluded locations.

For example, FIG. 9 illustrates an example user interface 900 that displays selected and excluded locations. The user interface 900 displays selected locations of Indiana and Illinois (e.g., corresponding to markers 902 and 904 and entries 906 and 908 in a selected locations list 910, respectively) and excluded locations of Wisconsin and Michigan (e.g., corresponding to markers 912 and 914 and entries 916 and 918 in an excluded locations list 920, respectively).

The user can use a search control 922 to search for other locations and can select a control 924 to return to the user interface 800 described above with respect to FIG. 8.

Figure 10:
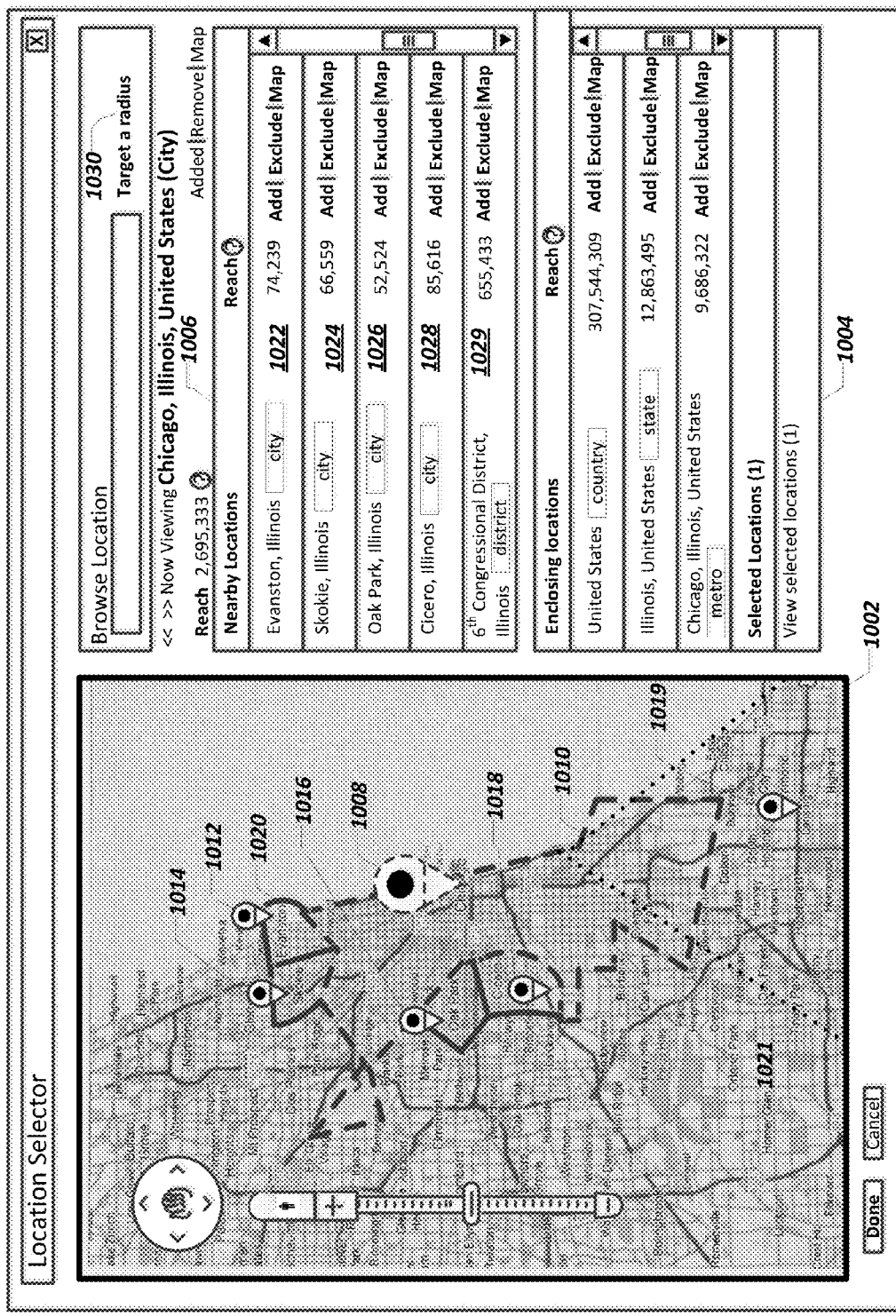
FIG. 10 illustrates an example user interface that displays locations nearby a location of interest.

FIG. 10 illustrates another example user interface 1000 that displays locations nearby a location of interest. The user interface 1000 includes a map 1002, an enclosing locations list 1004, and a nearby locations list 1006. Similar to the enclosing locations list 816 described above with respect to FIG. 8, the enclosing locations list 1004 includes locations that enclose the location of interest of the city of Chicago.

The map 1002 includes a marker 1008 which marks the location of interest of the city of Chicago. An outline 1010 indicates the border of the city of Chicago. The map 1002 also includes markers 1012, 1014, 1016, 1018, and 1019 which mark the cities of Evanston, Skokie, Oak Park, and Cicero, Ill., and the $6^{th}$ Congressional district of Illinois, respectively, which have been determined to be located nearby the selected city of Chicago. In some implementations, the markers 1012-1019 are shown in a different color or in a different size than the marker 1008. As illustrated by a solid outline 1020 marking the boundary of Evanston and a dotted outline 1021 marking the boundary of the $6^{th}$ Congressional district each having a different line style than the dashed outline 1010, the outline and a color used for a geographic location of interest (e.g., the city of Chicago) can be different than the outline or color of an identified nearby location (e.g., Evanston) and the color or outline of a nearby location can vary based on the type of nearby location.

The markers 1012-1019 correspond respectively to entries 1022-1029 in the nearby locations list 1006. Each entry 1022-1029 includes estimated reach information and controls to add the corresponding nearby location to the campaign, exclude the nearby location from the campaign, or to see the nearby location on a map. In addition to being presented with locations that are determined to be nearby to a selected location, the user can select a control 1030 to view locations that are within a radius distance of a particular, specified location.

Figure 11:
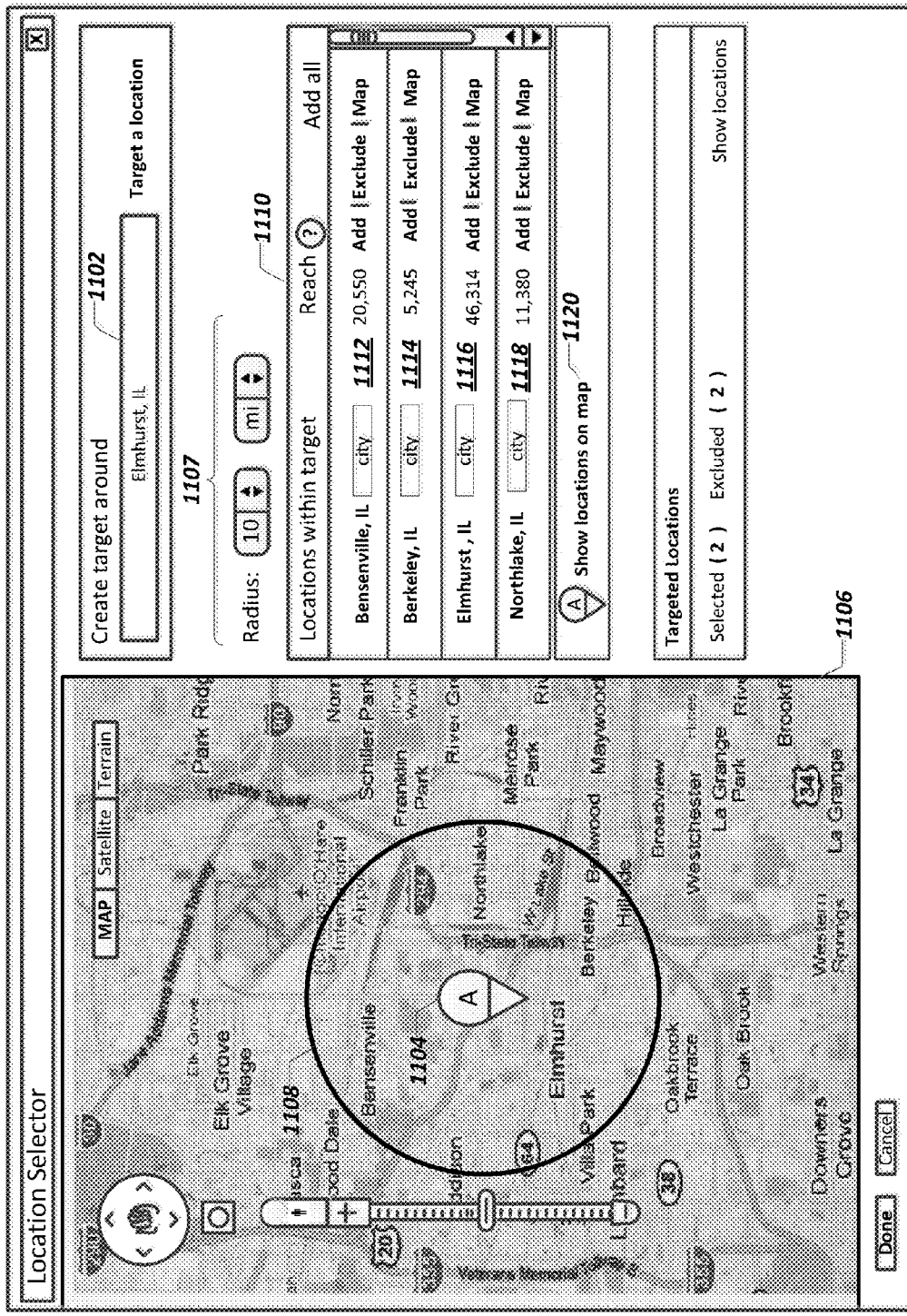
FIG. 11 illustrates an example user interface for displaying locations within a radius distance of a selected location.

For example, FIG. 11 illustrates an example user interface 1100 for displaying locations within a radius distance of a selected location. The user can specify a location using a control 1102 (e.g., the user has specified an address of "300 W. North Ave., Elmhurst, Ill."). A marker 1104 marks the specified location on a map 1106. The user can specify a radius distance using controls 1107 (e.g., the user has specified a radius distance of ten miles). A circle target area 1108 can illustrate, on the map 1106, the specified radius distance around the specified location.

A locations-within-target list 1110 includes entries 1112-1118 which correspond to locations of the cities of Bensenville, Berkeley, Elmhurst, and Northlake, Ill., respectively, which are each located within or overlap a target area defined by the specified location and the specified radius distance. If locations that the user desires to target are not displayed within the locations-within-target list 1110 (or if too many locations are included), the user can adjust the size of the circle 1108 using the controls 1107.

The locations corresponding to the entries 1112-1118 can be determined, for example, by determining a relationship of each of multiple candidate locations that are identified as being proximate to the circle 1108. For example, for each candidate location, it can be determined whether the candidate location is entirely enclosed within the circle 1108, partially overlapping the circle 1108, outside of but within a threshold distance of the circle 1108, or outside of and more than a threshold distance from the circle 1108. In some implementations, nearby locations can be identified as candidate locations that are entirely enclosed within the circle 1108, overlap the circle 1108 by more than a threshold amount, or are outside of but within a threshold distance of the circle 1108.

Each of the entries 1112-1118 include estimated reach information and controls to add the corresponding location to the campaign, exclude the location from the campaign, or to see the location on the map 1106. The user can select a control 1120 to see each of the locations corresponding to the entries 1112-1118 on the map 1106. In some implementations, in response to selection of the control 1120, each of the locations corresponding to the entries 1112-1118 are marked or highlighted on the map 1106 with a marker and are outlined with an outline (e.g., similar to the outline 1020 discussed above with respect to FIG. 10).

Figure 12:
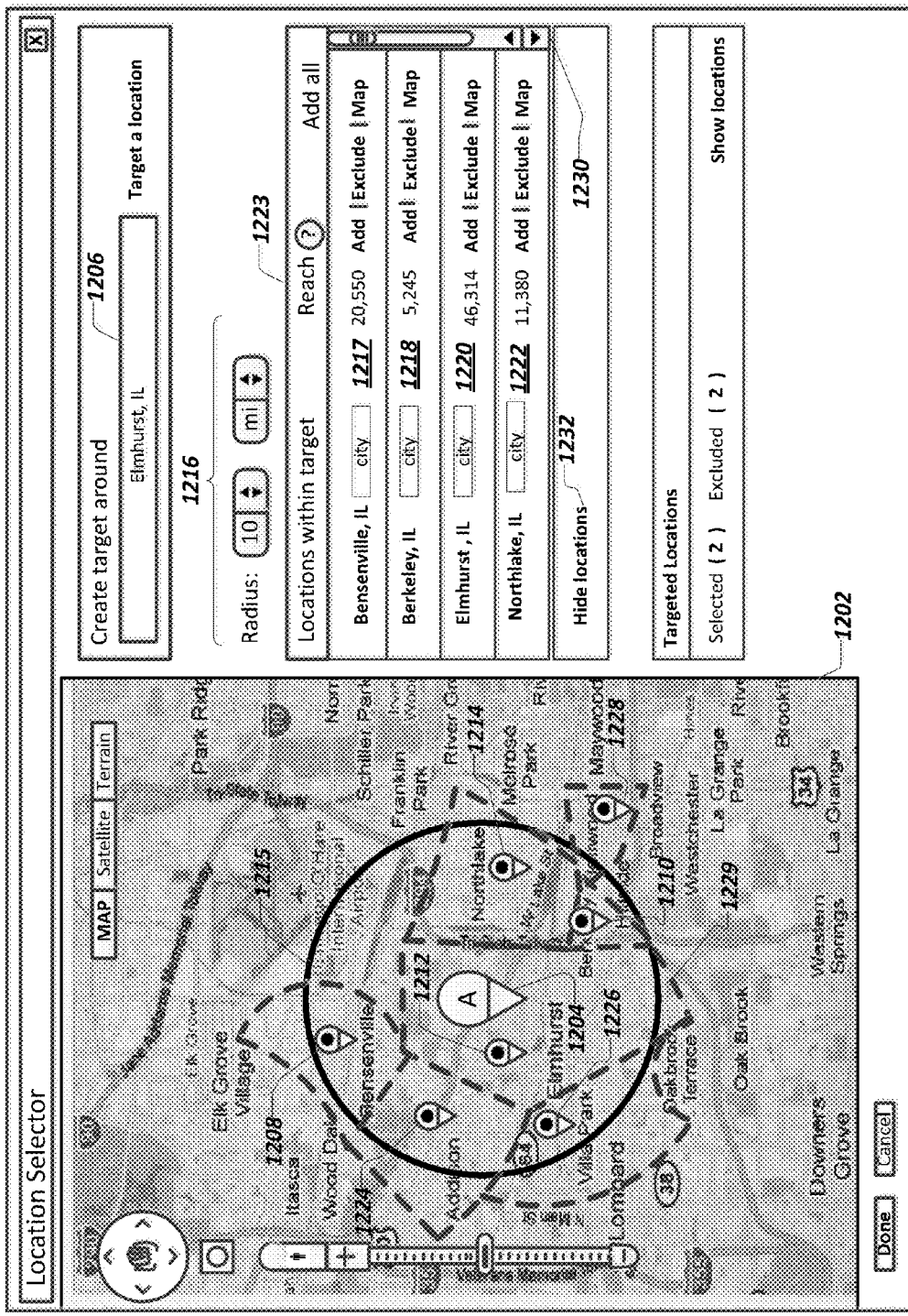
FIG. 12 illustrates an example user interface which displays nearby locations on a map.

For example, FIG. 12 illustrates an example user interface 1200 which displays nearby locations on a map 1202. The map 1202 includes a marker 1204 marking the location specified in a control 1206 and includes markers 1208-1214 which correspond to the locations of Bensenville, Berkeley, Elmhurst, and Northlake, Ill., respectively, which are each located within a target area 1215 defined by the specified location and the specified radius distance (e.g., corresponding to a control 1216) and which correspond to entries 1217-1222 that are included in a locations-within-target list 1223. The map 1202 also includes markers 1224, 1226, and 1228 which correspond to the locations of Addison, Villa Park, and Bellwood, Ill., which are each also located within the target area 1215. The markers 1208-1214 and 1224-1228 are illustrated by corresponding outlines (e.g., an outline 1229) which mark the borders of the associated locations. Although the locations-within-target list does not currently display entries associated with the markers 1224-1228, the locations-within-target list 1223 can include entries associated with the markers 1224-1228 and the user can use a scroll control 1230 to view such entries. The user can select a control 1232 to hide the markers 1208-1214 and 1224-1228 and associated outlines.

Figure 13:
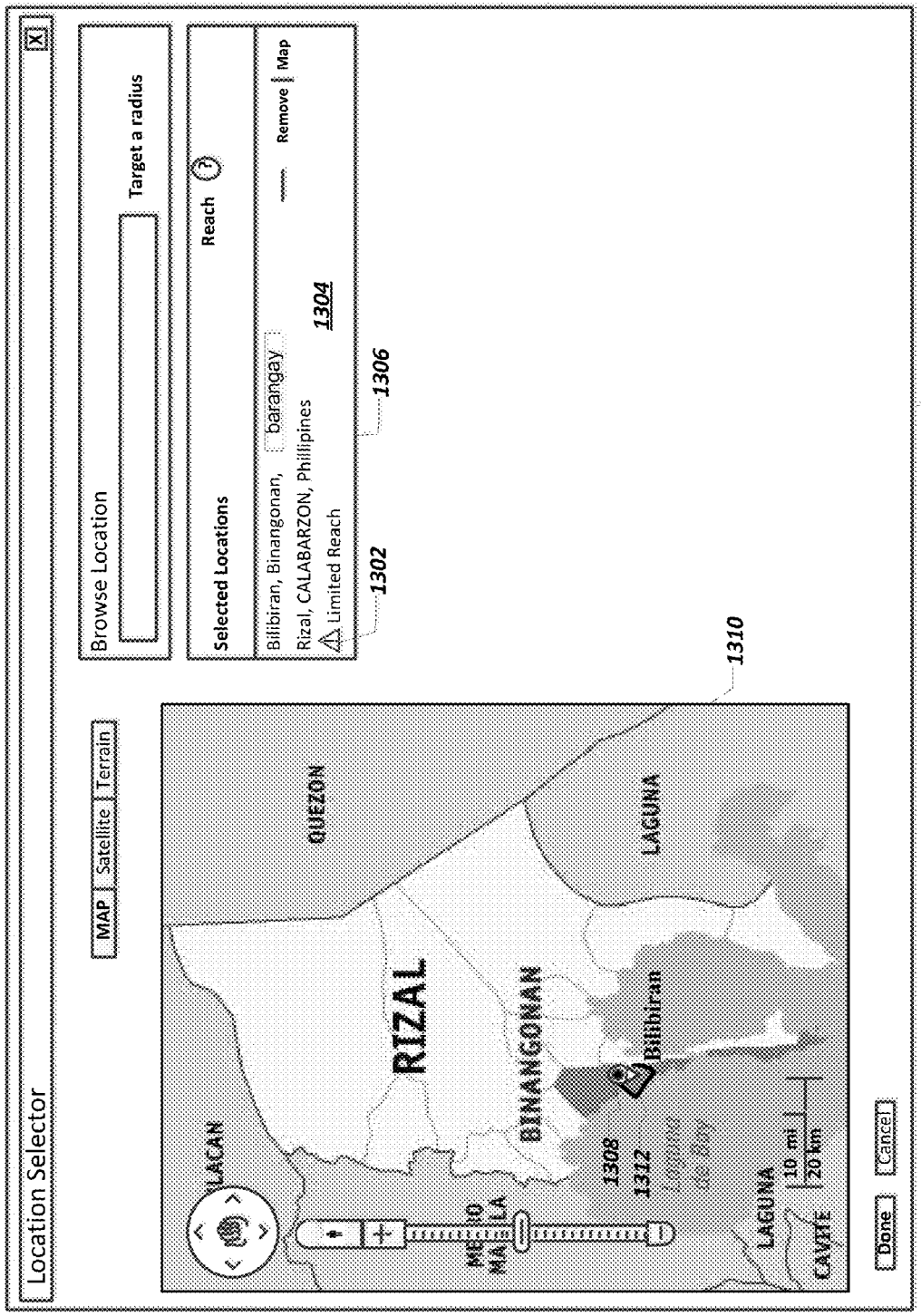
FIG. 13 illustrates an example user interface which includes a limited reach indicator.

FIG. 13 illustrates an example user interface 1300 which includes a limited reach indicator or badge 1302. In some implementations, the limited reach indicator can be used as an indicator that the content delivery system has limited information about the location, such as for example, limited information about the estimated reach that is associated with the location. For example, the limited reach indicator 1302 is included in an entry 1304 in a selected locations list 1306, where the entry 1304 corresponds to a location of the barangay of Bilibiran, which is within the city of Binangonan, the province of Rizal, and the region of CALABARZON, in the Philippines. A barangay can be, for example, a village that is a subset of a larger municipality. A marker 1308 on a map 1310 marks the barangay of Bilibiran and an outline 1312 marks the border of Bilibiran. The limited reach indicator can also be displayed for a suggested location, an enclosing location, a nearby location, a location within a target, or other types of locations where the system has limited information about the estimated reach.

In some implementations, the limited reach indicator 1302 can be shown when a confidence level related to available estimated reach information is less than a threshold level. For example, a confidence level may be reduced if a content management system does not determine a threshold confidence level regarding a user's location based on the IP address of the user. For example, the content management system may not have sufficient data regarding which IP addresses correspond to a specific location, (e.g., the Bilibiran location). Content may still be targeted to users in a limited reach designated location, but the results may be much more difficult to predict.

Example Processes

Figure 14:
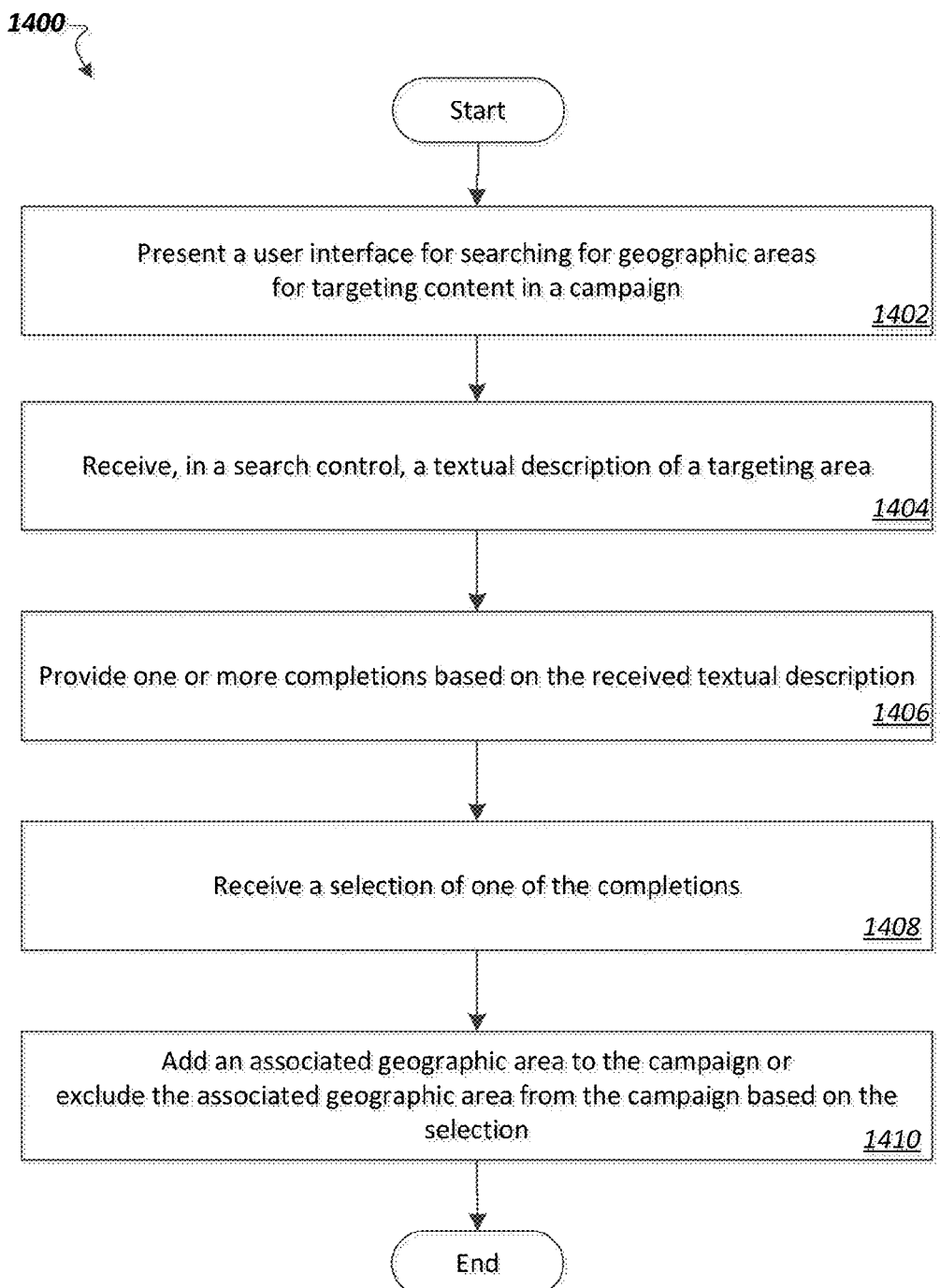
FIG. 14 is a flowchart of an example process for presenting a campaign management user interface to a campaign sponsor.

FIG. 14 is a flowchart of an example process 1400 for presenting a campaign management user interface to a campaign sponsor. The process 1400 can be performed, for example, by the content management system 110 described above with respect to FIG. 1. Alternatively or conjunctively, the process 1400 may be performed by one or more computing devices or systems.

A user interface is presented to a campaign sponsor (1402). For example, the content management system 110 can present the user interface 400 to a content provider 108. The user interface includes a control for enabling the user to search for geographic areas for targeting content in a campaign. Presenting the user interface includes presenting a search control for customizing targeting for the campaign. For example, the user interface 400 includes the search control 404.

A textual description is received, in the search control, for a targeting area to be associated with the campaign (1404). For example, as shown in FIG. 4, the content provider 108 can enter the text 402 "Chicago" into the search control 404.

One or more completions are provided based on the received textual description (1406), where each completion satisfies the textual description. For example, the completions 406-422 are provided in the search completions area 401. Providing the one or more completions includes providing one or more geographic areas that are associated with or described by the textual description and further includes providing reach information describing an estimated reach in terms of the number of users that are associated with the geographic area in a predetermined time period. For example, the completion 406 corresponds to the city of Chicago, Ill., and the completion 406 includes reach information 424, which indicates that the reach of the city of Chicago is 2,695,333.

A control can be presented, along with the one or more completions, for enabling display of a map for visually presenting on the map a geographic area associated with a given completion. For example, in FIG. 4, the text "Chicago, Ill., United States" included in the completion 406 can be a selectable control, and upon selection, the user interface 800 displayed in FIG. 8 can be displayed, which includes a map 802 which presents an area including the city of Chicago.

A selection of one or more of the completions is received (1408). For example, the user can select the completion 422 corresponding to the United States. An associated geographic area is added to or excluded from the campaign based on the selection (1410). For example, as illustrated in FIG. 5, the geographic location of the United States is included in the selected locations list 504 which displays geographic locations which have been added to a campaign.

Figure 15:
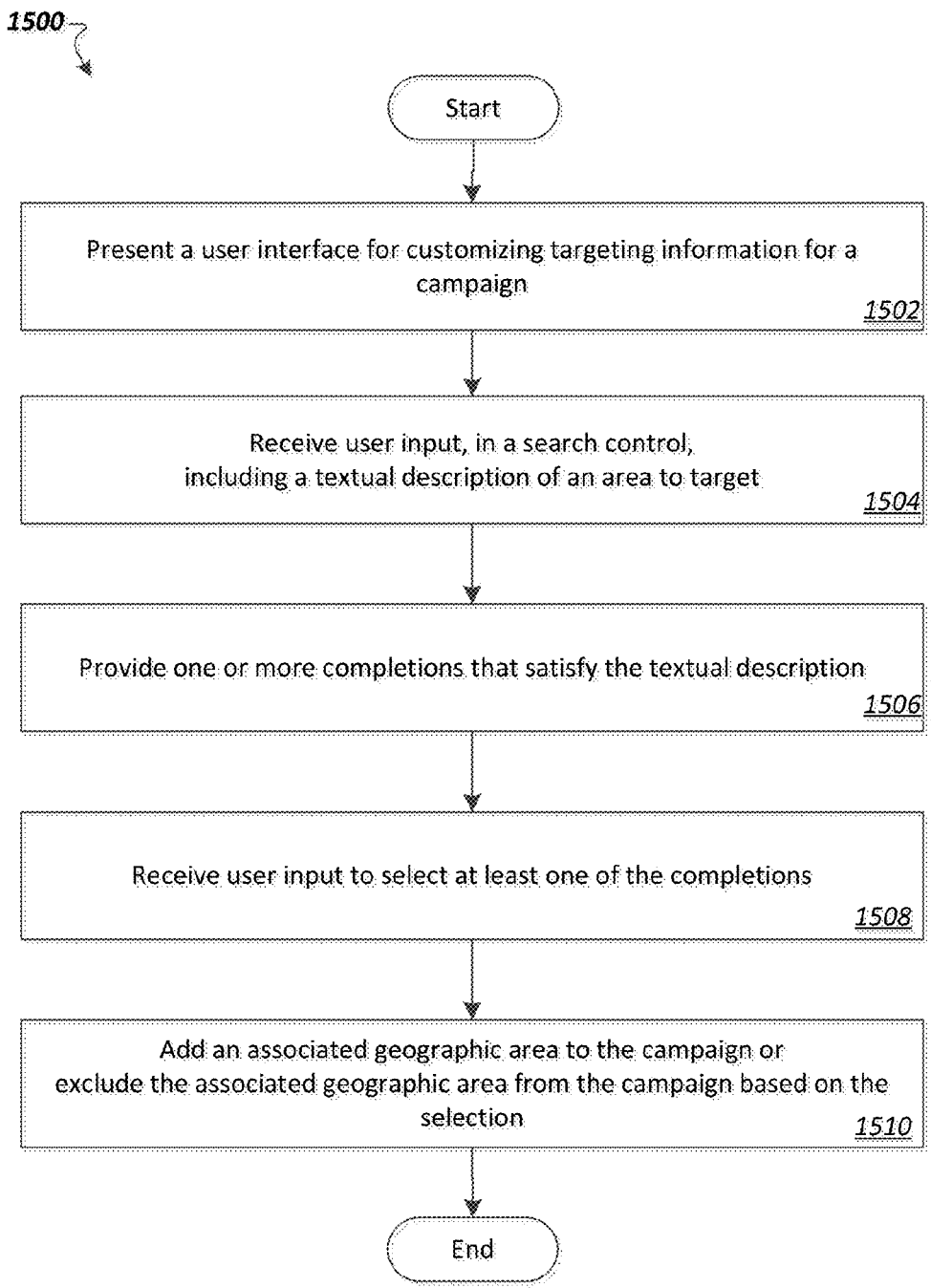
FIG. 15 is a flowchart of an example process for presenting a campaign management user interface to a campaign sponsor.

FIG. 15 is a flowchart of an example process 1500 for presenting a campaign management user interface to a campaign sponsor. The process 1500 can be performed, for example, by the content management system 110 described above with respect to FIG. 1. Alternatively or conjunctively, the process 1500 may be performed by one or more computing devices or systems.

A user interface is presented to a campaign sponsor for customizing targeting information for a campaign (1502). For example, the content management system 110 can present the user interface 400 to a content provider (e.g., to an advertiser) 108. The user interface includes a search control for discovering locations for targeting. For example, the user interface 400 includes the search control 404.

A user input, including a textual description of a location to target, is received in the search control (1504). For example, as shown in FIG. 4, the content provider 108 can enter the text 402 "Chicago" into the search control 404.

One or more completions that satisfy the textual description and estimated reach information for each completion are provided (1506). For example, the completions 406-422 are provided in the search completions area 401. Each completion is representative of a geographic feature that can be targeted in the campaign. For example, the completions 406-422 represent the cities of Chicago, Chicago Heights, and Chicago Ridge, Chicago O'Hare International Airport, the Chicago metro area, and the unincorporated Chicago Park, Calif., respectively.

Providing one or more completions can include providing a control for presenting a map of a geographic area associated with a completion, and presenting the geographic area in a map upon receipt of a selection of the control by a user. For example, in FIG. 4, the text "Chicago, Ill., United States" included in the completion 406 can be a selectable control, and upon selection, the user interface 800 displayed in FIG. 8 can be displayed, which includes a map 802 which presents an area including the city of Chicago.

One or more labels associated with each completion can be provided, where the label represents a specific geographic area and includes one or more hierarchical elements that are in a path description for a respective geographic location. For example, with respect to FIG. 4, the completion 406 includes city, state, and country labels of "Chicago", "Illinois", and "United States", respectively.

User input to select at least one of the completions corresponding to a geographic location is received (1508). For example, the user can select the completion 422 corresponding to the United States. The geographic location is added to or excluded from the campaign based on the selection (1510). For example, as illustrated in FIG. 5, the geographic location of the United States is included in the selected locations list 504 which displays geographic locations which have been added to a campaign.

Figure 16:
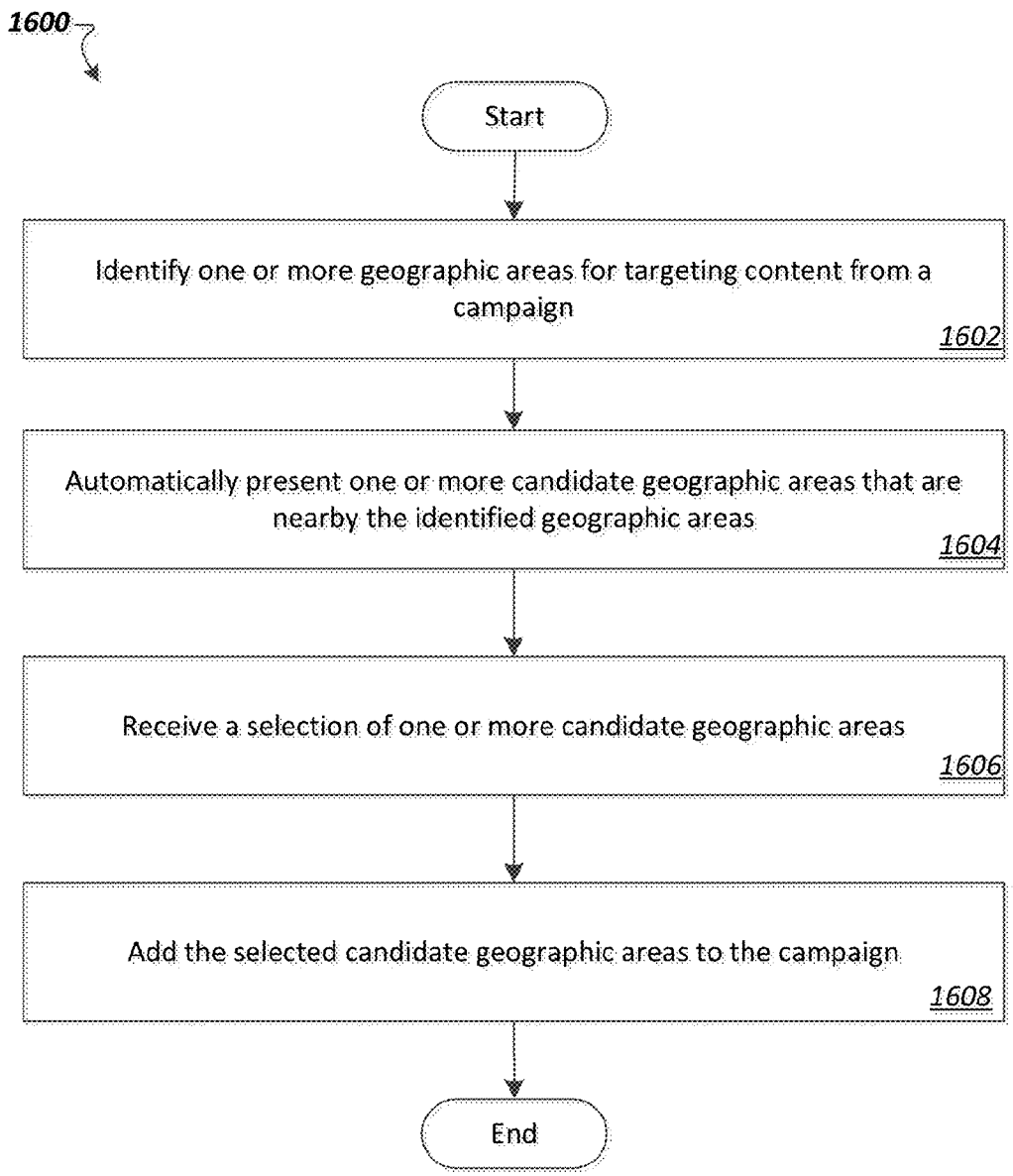
FIG. 16 is a flowchart of an example process for adding a geographic area to a content campaign.

FIG. 16 is a flowchart of an example process 1600 for adding a geographic location to a content campaign. The process 1600 can be performed, for example, by the content management system 110 described above with respect to FIG. 1. Alternatively or conjunctively, the process 1600 may be performed by one or more computing devices or systems.

One or more geographic locations are identified for targeting content from a campaign, for delivery to users (1602), where the campaign is associated with a content sponsor. The content sponsor can be, for example, the content provider (e.g., an advertiser) 108. A geographic location can be identified, for example, in response to the content sponsor entering a search string into a search control. For example, with respect to FIG. 3, the content sponsor can enter the text 402 representing the city of Chicago into the search control 404. The geographic location can be identified in response to the content sponsor selecting a search completion, such as the completion 406. The geographic location can be identified in response to the content sponsor selecting a geographic location that is selected for or excluded from the campaign, such as, with respect to FIG. 6, the entries 608 or 609 in the selected locations list 610 or the entry 613 in the excluded locations list 614.

A map including the one or more geographic locations associated with the campaign can be presented. For example, the user interface 800 of FIG. 8 includes a map 802 which presents the area that includes the city of Chicago, where the user interface 800 can be displayed in response to the user selecting a completion (e.g., the completion 406) representing the city of Chicago. In some implementations, a map can include a targeting area defined by a radius selected by a user. For example, the user interface 1100 of FIG. 11 includes a map 1106 which includes a targeting area 1108 defined by a location corresponding to user input provided using the control 1102 and a radius provided using the controls 1107.

One or more geographic locations that are nearby the one or more geographic locations associated with the campaign are automatically presented to the content sponsor (1604), including presenting candidate nearby geographic locations and estimated reach information along with each candidate geographic location. For example, one or more candidate nearby geographic locations can be identified, where each candidate nearby geographic location is nearby an existing geographic location associated with the campaign. In some implementations, nearby can be defined as being either adjacent, overlapping, proximate, or including (e.g., enclosing) an existing geographic area.

The candidate geographic locations can be presented in a list. For example, as shown in FIG. 10, locations nearby a location of interest of the city of Chicago are presented in the nearby locations list 1006 and locations that enclose the location of interest of the city of Chicago are presented in an enclosing locations list 1004.

Candidate nearby geographic locations can be presented in a map. For example, the nearby locations included in the nearby locations list 1006 are presented on the map 1002. As another example, in the user interface 1200 of FIG. 12, locations that are at least partially within the target area 1215 are displayed in the map 1202. The user interface 1200 of FIG. 12 is an example of presenting the candidate nearby geographic locations in a map (e.g., the map 1202) along with a location (e.g., corresponding to the contents of the control 1206) and a circular targeting area (e.g., the targeting area 1215), centered on the location, of a user selected radius (e.g., corresponding to the control 1216). In the example of FIG. 12, one or more candidate nearby geographic locations (e.g., corresponding to the markers 1208-1214 and 1224-1228) are identified as being at least partially included in a circle formed by the radius corresponding to the control 1216 centered on the location identified by the marker 1204.

A selection of one or more candidate geographic locations for inclusion in the campaign is received (1606). For example, with respect to FIG. 12, the user can select an add control included in the entry 1217 to request to add the associated geographic location of the city of Bensenville, Ill. to the campaign.

The selection is added to the campaign (1608). For example, with respect to FIG. 12, the geographic location of the city of Bensenville, Ill. can be added to the campaign in response to selection of the add control included in the associated entry 1217. In some implementations, in response to adding a geographic location to the campaign, a representation of an updated targeting area associated with the campaign that includes the selection can be presented on a map. For example, with respect to FIG. 12, in response to selection of the add control included in the entry 1217, the targeting area 1215 can be updated (e.g., expanded) so that the targeting area 1215 includes the location representing the city of Bensenville, Ill. marked by the marker 1208.

Figure 17:
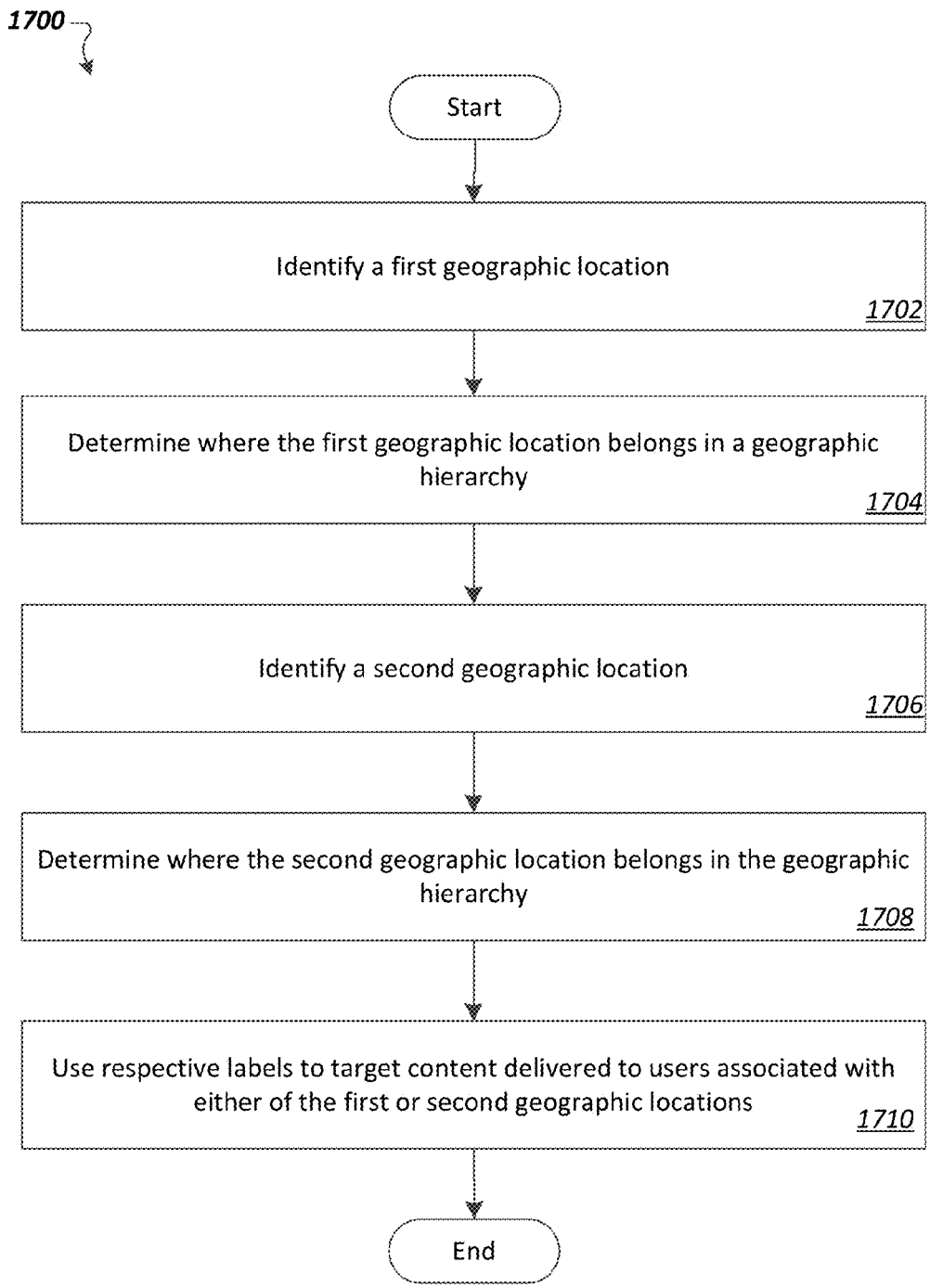
FIG. 17 is a flowchart of an example process for determining and using labels for geographic locations.

FIG. 17 is a flowchart of an example process 1700 for determining and using labels for geographic locations. The process 1700 can be performed, for example, by the content management system 110 described above with respect to FIG. 1. Alternatively or conjunctively, the process 1700 may be performed by one or more computing devices or systems.

A first geographic location is identified (1702). A geographic location can be identified, for example, in response to a content sponsor entering a search string into a search control. For example, with respect to FIG. 3, the content sponsor can enter the text 402 representing the city of Chicago into the search control 404. The geographic location can be identified when one or more search completions are provided, such as the completions 406-422. The geographic location can be identified in response to the content sponsor selecting a search completion, such as the completion 406. The geographic location can be identified in response to the content sponsor selecting a geographic location that is selected for or excluded from the campaign, such as, with respect to FIG. 6, the entries 608 or 609 in the selected locations list 610 or the entry 613 in the excluded locations list 614.

It is determined where, in a geographic hierarchy, the first geographic location belongs (1704). The determining can include associating one or more labels with the first geographic location, where each label is associated with a respective level in the geographic hierarchy that includes the first geographic location. For example, if the first geographic location is the city of Chicago (e.g., corresponding to the completion 406), city, state, and country labels of "Chicago", "Illinois", and "United States" can be associated with the first geographic location.

As another example, the hierarchical levels associated with the first geographic location can include country, metropolitan area, city and at least one other hierarchical level (e.g., state). For example, with respect to FIG. 4, the geographic location of Chicago Heights Ill. corresponding to the completion 408 can be associated with country, metropolitan area, city, and state hierarchical levels (e.g., corresponding to United States, Chicago metro area, Chicago Heights, and Illinois, respectively).

In some examples, the hierarchical levels associated with the first geographic location might not include at least one or more of metropolitan area or city. For example, if the first geographic location is in a small country, such as Barbados (e.g., corresponding to the marker 611 as shown in FIG. 6), then one hierarchical level (e.g., just country) may be associated with the first geographic location.

Although two hierarchical levels associated with the first geographic location may be related in a parent-child relationship (e.g., country and state), two or more of the hierarchical levels associated with the first geographic location might not be parent-child relationships. For example, a hierarchical level associated with the first geographic location may be a political district, and another hierarchical level associated with the first geographic location, may be unrelated to the political district. For example, with respect to FIG. 10, the city of Chicago (e.g., outlined by the outline 1010) partially overlaps the 6th Congressional district of Illinois (e.g., outlined by the outline 1021). That is, the city of Chicago is related to more than one congressional district, and the 6$^{th}$ Congressional district of Illinois is related to more than one city.

Returning to FIG. 17, a second, different geographic location is identified (1706). For example, with respect to FIG. 13, the barangay of Bilibiran can be identified, such as in response to the user adding the barangay of Bilibiran to a campaign, or in response to the user selecting the entry 1304 or the marker 1308.

It is determined where, in the geographic hierarchy, the second different geographic location belongs (1708). For example, the content management system 110 can determine one or more different number of levels in the geographic hierarchy to associate with the second, different geographic location than a number of levels in the geographic hierarchy associated with the first geographic location. For instance, in the example where the first geographic location is the city of Chicago, the first geographic location can be associated with three levels in the geographic hierarchy (e.g., city, state, and country). If the second geographic location is the barangay of Bilibiran, the second geographic location can be associated with five levels (e.g., barangay, city, province, region, and country). The determining can also include associating one or more labels for the one or more different number of levels with the second different geographic location. For example, if the second geographic location is the barangay of Bilibiran, one or more of the labels of "Bilibiran", "Binangonan", "Rizal", "CALABARZON", and the "Philippines" can be associated with the second geographic location, for example, as illustrated by the entry 1304 in FIG. 13.

In general, given two geographic locations, the number of levels associated with the first geographic location may be the same as or different than the number of levels associated with the second geographic location, and the number of levels associated with either the first or the second geographic location can be any number of levels. As a specific example, the number of levels associated with a first geographic location can be less than three (e.g., just country, as in the example of Barbados), and the number of levels associated with the second geographic location can be three or more (e.g., as in the examples of using city, state, and country, and using barangay, city, province, region, and country).

A number of levels associated with a particular geographic location or particular labels associated with the particular location can be changed. For example, if a particular region (e.g., a state) is redistricted, different (e.g., differently named, a different number of) political districts may be associated with the region. As another example, if a country is subdivided (e.g., the creation of a new country of South Sudan from the country of Sudan), then a new country and a different number of countries can be associated with the continent (e.g., Africa) that includes the new country.

In some implementations, respective labels are used to target content delivered to users associated with either of the first or second geographic locations (1710). For example, the labels associated with a geographic location may be presented when presenting information about the geographic location to a user. For example, with respect to FIG. 13, the labels "Bilibiran", "Binangonan", "Rizal", "CALABARZON", and "Philippines" are presented to the user in the entry 1304. As another example, with respect to FIG. 7, the labels of "Chicago", "IL", and "United States" are presented in the completion 704. As yet another example, with respect to FIG. 6, the label "Barbados" is presented in the entry 613.

The respective labels can be presented to users in a user interface enabling selection of a geographic feature associated with the respective label, and upon selection, information relating to the selected geographic feature can be presented. For example, in the entry 1304, each of the labels "Bilibiran", "Binangonan", "Rizal", "CALABARZON", and "Philippines" can be individually selectable, and the content management system 110 can display information (e.g., a map, reach information) related to a respective geographic location associated with a selected label, in response to the selection. The respective labels for a geographic location can be used to target users as part of a content targeting system.

Figure 18:
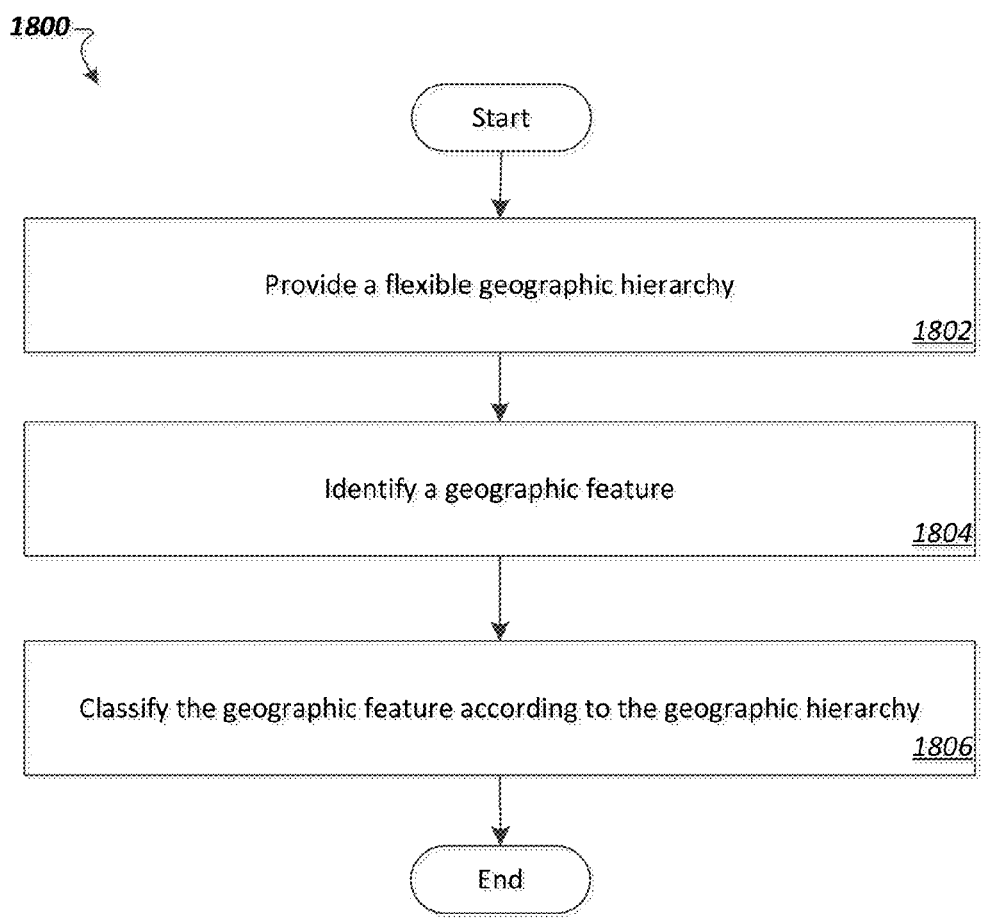
FIG. 18 is a flowchart of an example process for classifying geographic features.

FIG. 18 is a flowchart of an example process 1800 for classifying geographic features. The process 1800 can be performed, for example, by the content management system 110 described above with respect to FIG. 1. Alternatively or conjunctively, the process 1800 may be performed by one or more computing devices or systems.

A flexible geographic hierarchy of labels that includes a plurality of geographic features is provided (1802). For example, a flexible geographic hierarchy of labels can be provided by the content management system 110 based on the geographic information 124. Geographic features from different regions can be customized to include or be associated with a different number of levels in the geographic hierarchy.

A first geographic feature is identified (1804). A geographic feature can be identified, for example, in response to a content sponsor entering a search string into a search control. For example, with respect to FIG. 3, the content sponsor can enter the text 402 representing the city of Chicago into the search control 404. The geographic feature can be identified when one or more search completions are provided, such as the completions 406-422. The geographic feature can be identified in response to the content sponsor selecting a search completion, such as the completion 406. The geographic feature can be identified in response to the content sponsor selecting a geographic feature that is selected for or excluded from the campaign, such as, with respect to FIG. 6, the entries 608 or 609 in the selected features list 610 or the entry 613 in the excluded features list 614.

The first geographic feature is classified in accordance with the flexible geographic hierarchy (1806). Classifying can include assigning to the first geographic feature respective labels from each hierarchical level in the flexible geographic hierarchy that includes the first geographic feature, including assigning a first number of labels to the first geographic feature. For example, the first number can be one, two, three, four, or a larger number, such as a number greater than four. For example, with respect to FIG. 13, if the first geographic feature is the barangay of Bilibiran (e.g., corresponding to the marker 1308), five labels of "Bilibiran", "Binangonan", "Rizal", "CALABARZON", and "Philippines", representing levels of barangay, city, province, region, and country, respectively, can be assigned to the first geographic feature. One or more of these five labels can be presented when the first geographic feature is presented (e.g., as shown in the entry 1304).

A second, different geographic feature can be identified and classified in accordance with the flexible geographic hierarchy, including assigning to the second, different geographic feature respective labels from each hierarchical level in the flexible geographic hierarchy that includes the second different geographic feature, and including assigning a second, different number of labels to the first geographic feature. For example, if the second, different geographic feature is the country of Barbados, a single hierarchical level (e.g., country) and a single label (e.g., "Barbados") can be associated with the second geographic feature.

Additional Embodiments

Figure 19:
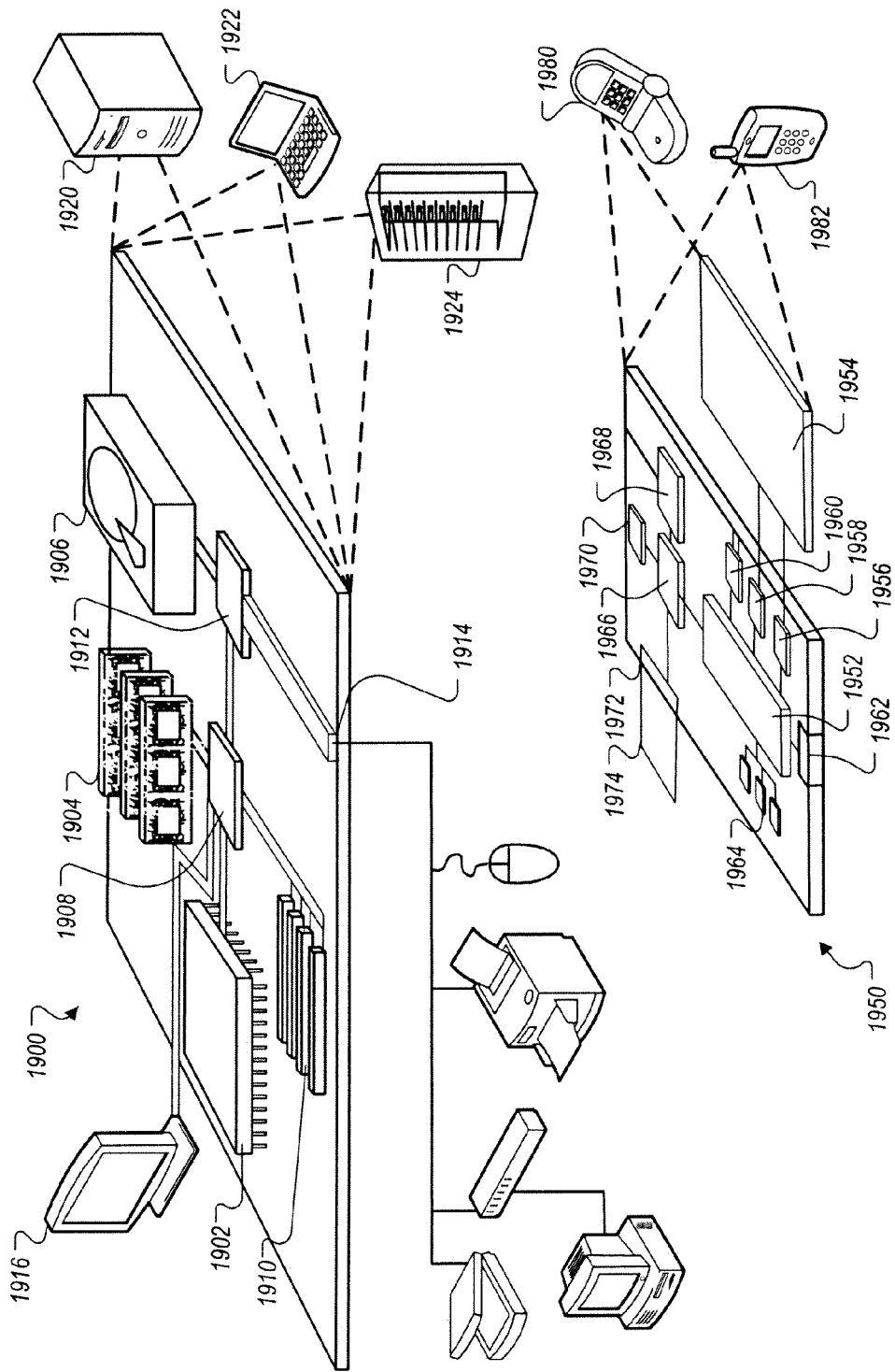
FIG. 19 is a block diagram of computing devices that may be used to implement the systems and methods described in this document, as either a client or as a server or plurality of servers.

FIG. 19 is a block diagram of computing devices 1900, 1950 that may be used to implement the systems and methods described in this document, as either a client or as a server or plurality of servers. Computing device 1900 is intended to represent various forms of digital computers, such as laptops, desktops, televisions with one or more processors embedded therein or coupled thereto, workstations, personal digital assistants, servers, blade servers, mainframes, and other appropriate computers. Computing device 1950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1900 includes a processor 1902, memory 1904, a storage device 1906, a high-speed interface 1908 connecting to memory 1904 and high-speed expansion ports 1910, and a low speed interface 1912 connecting to low speed bus 1914 and storage device 1906. Each of the components 1902, 1904, 1906, 1908, 1910, and 1912, are interconnected using various busses, and may be mounted on a common motherboard or in other manners as appropriate. The processor 1902 can process instructions for execution within the computing device 1900, including instructions stored in the memory 1904 or on the storage device 1906 to display graphical information for a GUI on an external input/output device, such as display 1916 coupled to high speed interface 1908. In other implementations, multiple processors and/or multiple buses may be used, as appropriate, along with multiple memories and types of memory. Also, multiple computing devices 1900 may be connected, with each device providing portions of the necessary operations (e.g., as a server bank, a group of blade servers, or a multi-processor system).

The memory 1904 stores information within the computing device 1900. In one implementation, the memory 1904 is a computer-readable medium. In one implementation, the memory 1904 is a volatile memory unit or units. In another implementation, the memory 1904 is a non-volatile memory unit or units.

The storage device 1906 is capable of providing mass storage for the computing device 1900. In one implementation, the storage device 1906 is a computer-readable medium. In various different implementations, the storage device 1906 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1904, the storage device 1906, or memory on processor 1902.

The high speed controller 1908 manages bandwidth-intensive operations for the computing device 1900, while the low speed controller 1912 manages lower bandwidth-intensive operations. Such allocation of duties is exemplary only. In one implementation, the high-speed controller 1908 is coupled to memory 1904, display 1916 (e.g., through a graphics processor or accelerator), and to high-speed expansion ports 1910, which may accept various expansion cards (not shown). In the implementation, low-speed controller 1912 is coupled to storage device 1906 and low-speed expansion port 1914. The low-speed expansion port, which may include various communication ports (e.g., USB, Bluetooth, Ethernet, wireless Ethernet) may be coupled to one or more input/ output devices, such as a keyboard, a pointing device, a scanner, or a networking device such as a switch or router, e.g., through a network adapter.

The computing device 1900 may be implemented in a number of different forms, as shown in the figure. For example, it may be implemented as a standard server 1920, or multiple times in a group of such servers. It may also be implemented as part of a rack server system 1924. In addition, it may be implemented in a personal computer such as a laptop computer 1922. Alternatively, components from computing device 1900 may be combined with other components in a mobile device (not shown), such as device 1950. Each of such devices may contain one or more of computing device 1900, 1950, and an entire system may be made up of multiple computing devices 1900, 1950 communicating with each other.

Computing device 1950 includes a processor 1952, memory 1964, an input/output device such as a display 1954, a communication interface 1966, and a transceiver 1968, among other components. The device 1950 may also be provided with a storage device, such as a micro drive or other device, to provide additional storage. Each of the components 1950, 1952, 1964, 1954, 1966, and 1968, are interconnected using various buses, and several of the components may be mounted on a common motherboard or in other manners as appropriate.

The processor 1952 can process instructions for execution within the computing device 1950, including instructions stored in the memory 1964. The processor may also include separate analog and digital processors. The processor may provide, for example, for coordination of the other components of the device 1950, such as control of user interfaces, applications run by device 1950, and wireless communication by device 1950.

Processor 1952 may communicate with a user through control interface 1958 and display interface 1956 coupled to a display 1954. The display 1954 may be, for example, a TFT LCD display or an OLED display, or other appropriate display technology. The display interface 1956 may comprise appropriate circuitry for driving the display 1954 to present graphical and other information to a user. The control interface 1958 may receive commands from a user and convert them for submission to the processor 1952. In addition, an external interface 1962 may be provide in communication with processor 1952, so as to enable near area communication of device 1950 with other devices. External interface 1962 may provide, for example, for wired communication (e.g., via a docking procedure) or for wireless communication (e.g., via Bluetooth or other such technologies).

The memory 1964 stores information within the computing device 1950. In one implementation, the memory 1964 is a computer-readable medium. In one implementation, the memory 1964 is a volatile memory unit or units. In another implementation, the memory 1964 is a non-volatile memory unit or units. Expansion memory 1974 may also be provided and connected to device 1950 through expansion interface 1972, which may include, for example, a SIMM card interface. Such expansion memory 1974 may provide extra storage space for device 1950, or may also store applications or other information for device 1950. Specifically, expansion memory 1974 may include instructions to carry out or supplement the processes described above, and may include secure information also. Thus, for example, expansion memory 1974 may be provide as a security module for device 1950, and may be programmed with instructions that permit secure use of device 1950. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The information carrier is a non-transitory computer- or machine-readable medium, such as the memory 1964, expansion memory 1974, or memory on processor 1952. The non-transitory computer- or machine-readable medium contains instructions that, when executed, perform one or more methods or operations, such as those described above.

Device 1950 may communicate wirelessly through communication interface 1966, which may include digital signal processing circuitry where necessary. Communication interface 1966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1968. In addition, short-range communication may occur, such as using a Bluetooth, WiFi, or other such transceiver (not shown). In addition, GPS receiver module 1970 may provide additional wireless data to device 1950, which may be used as appropriate by applications running on device 1950.

Device 1950 may also communication audibly using audio codec 1960, which may receive spoken information from a user and convert it to usable digital information. Audio codex 1960 may likewise generate audible sound for a user, such as through a speaker, e.g., in a handset of device 1950. Such sound may include sound from voice telephone calls, may include recorded sound (e.g., voice messages, music files, etc.) and may also include sound generated by applications operating on device 1950.

The computing device 1950 may be implemented in a number of different forms, as shown in the figure. For example, it may be implemented as a cellular telephone 1980. It may also be implemented as part of a smartphone 1982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any non-transitory signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A machine-implemented method, the method comprising:
   presenting a user interface for a campaign sponsor, using one or more computing devices, the user interface including a control for enabling the user to search for geographic areas for targeting content in a campaign where presenting includes presenting a search control for customizing targeting for the campaign;
   receiving, in the search control, using the one or more computing devices, a textual description for a targeting area to be associated with the campaign;
   presenting, using the one or more computing devices, one or more results based on the received textual description, each result satisfying the textual description, where presenting the one or more results includes:
      presenting a name of one or more geographic areas that are associated with or described by the textual description,
      presenting estimated reach information indicating a number of unique users to be targeted within the one or more geographic areas in a predetermined time period, and
      presenting a limited reach indicator based on a confidence level related to available estimated reach information;
   presenting with each result, using the one or more computing devices:
      an add control that, when selected, adds a geographic area associated with the result to the campaign, and
      an exclude control that, when selected, excludes a geographic area associated with the result from the campaign;
   receiving, using the one or more computing devices, for at least one of the one or more results, a selection of one of the add control or the exclude control corresponding to the at least one of the one or more results; and
   adding, using the one or more computing devices, an associated geographic area to the campaign or excluding the associated geographic area from the campaign based on the selection.

2. The method of claim 1, further comprising:
   presenting, along with the one or more results, a control for enabling display of a map for visually presenting on a map a geographic area associated with a given result.

3. The method of claim 1, wherein the one or more results include one result that represents a first geographic area that encloses a second geographic area associated with another result.

4. The method of claim 3, wherein the first geographic area is a state or country.

5. The method of claim 3, wherein the second geographic area is a city.

6. A system, comprising:
   one or more memories;
   one or more processors configured to execute instructions to perform operations, the operations comprising:
      providing a user interface including controls for enabling selection of targeting criteria by a content sponsor, the user interface including:
         a campaign tool for receiving input on campaign details, the campaign tool including:
            a search control configured to receive search strings and configured to provide, based on the received search strings:
               search results that represent one or more geographic areas and estimated reach information for each geographic area, wherein the estimated reach information for each geographic area indicates a number of unique users to be targeted within the geographic area, and
               a limited reach indicator based on a confidence level related to available estimated reach information;
            an add control configured to be presented with each search result and configured to, upon selection, add a geographic area associated with the respective search result to a campaign,
            an exclude control configured to be presented with each search result and configured to, upon selection, exclude the geographic area associated with the respective search result from the campaign, and
            a map control configured to be presented with each search result and configured to, upon selection, present a map of the geographic area associated with the respective search result.

7. The system of claim 6, wherein the reach information for each geographic area indicates the number of unique users to be targeted within the geographic area in a predetermined time period.

8. A machine-implemented method, the method comprising;
presenting, using one or more computing devices, a user interface for a campaign sponsor for customizing targeting information for a campaign including a search control for discovering areas for targeting;
receiving, using the one or more computing devices, user input in the search control including a textual description of an area to target;
providing, using the one or more computing devices:
one or more results that satisfy the textual description,
estimated reach information for each result, each result representative of a geographic feature that can be targeted in the campaign, wherein the estimated reach information for each result indicates a number of unique users to be targeted within a geographic feature associated with the result, and
a limited reach indicator based on a confidence level related to available estimated reach information;
providing with each result, using the one or more computing devices:
an add control that, when selected, adds a geographic feature associated with the result to the campaign, and
an exclude control that, when selected, excludes a geographic feature associated with the result from the campaign;
receiving, using the one or more computing devices, for at least one of the one or more results, user input to select one of the add control or the exclude control corresponding to the at least one of the one or more results; and
adding, using the one or more computing devices, the geographic area to the campaign or excluding the geographic area from the campaign based on the selection.

9. The method of claim 8, wherein providing one or more results includes providing a control for presenting a map of a geographic area associated with a result, and presenting the geographic area in a map upon receipt of a selection of the control by a user.

10. The method of claim 8, further comprising:
providing a label associated with each result that represents a specific geographic area and includes one or more hierarchical elements that are in a path description for a respective geographic area.

11. The method of claim 8, further comprising:
determining the estimated reach information for each result.

12. The method of claim 8, wherein the limited reach indicator is provided if the confidence level is below a predetermined threshold.

13. The method of claim 8, wherein the confidence level is determined based on a location derived from an IP address of a user.

14. A non-transitory computer-readable medium comprising instructions stored therein, which when executed by a machine, cause the machine to perform operations comprising:
presenting, using one or more computing devices, a user interface for a campaign sponsor for customizing targeting information for a campaign including a search control for discovering areas for targeting;
receiving, using the one or more computing devices, user input in the search control including a textual description of an area to target;
presenting, using the one or more computing devices:
one or more results that satisfy the textual description,
estimated reach information for each result, each result representative of a geographic feature that can be targeted in the campaign, wherein the estimated reach information for each result indicates a number of unique users to be targeted within a geographic feature associated with the result, and
a limited reach indicator based on a confidence level related to available estimated reach information;
presenting with each result, using the one or more computing devices:
an add control that, when selected, is configured to add a geographic feature associated with the result to the campaign, and
an exclude control that, when selected, is configured to exclude a geographic feature associated with the result from the campaign;
receiving, using the one or more computing devices, user input to select at least one of the results corresponding to a geographic area, wherein the receiving comprises receiving user input to select one of the add control or the exclude control associated with the at least one of the results; and
adding, using the one or more computing devices, the geographic area to the campaign or excluding the geographic area from the campaign based on the selection.

15. The non-transitory computer-readable medium of claim 14, wherein presenting one or more results includes providing a control for presenting a map of a geographic area associated with a result, and presenting the geographic area in a map upon receipt of a selection of the control by a user.

16. The non-transitory computer-readable medium of claim 14, further comprising instructions stored therein, which when executed by the machine, cause the machine to perform further operations comprising:
providing a label associated with each result that represents a specific geographic area and includes one or more hierarchical elements that are in a path description for a respective geographic area.

17. The non-transitory computer-readable medium of claim 14, further comprising instructions stored therein, which when executed by the machine, cause the machine to perform further operations comprising:
determining the estimated reach information for each result.

18. The non-transitory computer-readable medium of claim 14, wherein the limited reach indicator is presented if the confidence level is below a predetermined threshold.

19. The non-transitory computer-readable medium of claim 14, wherein the confidence level is determined based on a location derived from an IP address of a user.

20. A content delivery system comprising:
one or more processors; and
a machine-readable medium comprising instructions stored therein, which when executed by the one or more processors, cause the one or more processors to perform operations comprising:
providing a campaign management user interface, wherein the campaign management user interface includes a campaign tool configured to receive input on campaign details to be executed by the content delivery system, and wherein the campaign tool is configured to, upon selection:
present a user interface for a campaign sponsor, the user interface including a control for enabling the user to search for geographic areas for targeting content in a campaign where presenting includes presenting a search control for customizing targeting for the campaign;
receive, in the search control, a textual description for a targeting area to be associated with the campaign;
present one or more results based on the received textual description, each result satisfying the textual description, where presenting the one or more results includes:
- presenting one or more geographic areas that are associated with or described by the textual description,
- presenting estimated reach information indicating a number of unique users to be targeted within the one or more geographic areas in a predetermined time period, and
- presenting a limited reach indicator based on a confidence level related to available estimated reach information;

present with each result:
- an add control that, when selected, is configured to add a geographic area associated with the result to the campaign, and
- an exclude control that, when selected, is configured to exclude a geographic area associated with the result from the campaign;

receive a selection of one or more of the results, wherein, for a result among the one or more of the selected results, the selection comprises a selection of one of the add control or the exclude control associated with the result; and add an associated geographic area to the campaign or exclude the associated geographic area from the campaign based on the selection.

* * * * *